United States Patent
Shin et al.

(10) Patent No.: US 11,501,771 B2
(45) Date of Patent: Nov. 15, 2022

(54) COOKING APPARATUS AND COOKING SYSTEM

(71) Applicant: SAMSUNG ELECTRONICS CO., LTD., Suwon-si (KR)

(72) Inventors: Woo Cheol Shin, Cheongju-si (KR); Nam Gook Cho, Suwon-si (KR); Eun Jin Chun, Suwon-si (KR); Seol Hee Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 16/643,783

(22) PCT Filed: May 23, 2018

(86) PCT No.: PCT/KR2018/005824
§ 371 (c)(1),
(2) Date: Mar. 2, 2020

(87) PCT Pub. No.: WO2019/045228
PCT Pub. Date: Mar. 7, 2019

(65) Prior Publication Data
US 2020/0234702 A1    Jul. 23, 2020

(30) Foreign Application Priority Data
Aug. 31, 2017  (KR) .................. 10-2017-0110771

(51) Int. Cl.
*G10L 15/22*       (2006.01)
*G06F 16/9035*   (2019.01)
(Continued)

(52) U.S. Cl.
CPC ............... *G10L 15/22* (2013.01); *F24C 7/08* (2013.01); *G06F 16/9035* (2019.01);
(Continued)

(58) Field of Classification Search
CPC ........ F24C 15/2021; F24C 3/126; F24C 7/08; F24C 7/085; G10L 15/22; G10L 15/10;
(Continued)

(56) References Cited

U.S. PATENT DOCUMENTS

| | | | |
|---|---|---|---|
| 2003/0023448 A1* | 1/2003 | Geiger | F24C 15/2021 704/E15.045 |
| 2003/0163325 A1* | 8/2003 | Maase | F24C 15/2021 704/E15.045 |

(Continued)

FOREIGN PATENT DOCUMENTS

| | | |
|---|---|---|
| EP | 1 054 390 A2 | 11/2000 |
| EP | 1 054 390 A3 | 11/2000 |

(Continued)

OTHER PUBLICATIONS

Office Action dated Dec. 7, 2021 in Korean Application No. 10-2017-0110771.

(Continued)

*Primary Examiner* — Matthew H Baker
(74) *Attorney, Agent, or Firm* — Staas & Halsey LLP

(57) ABSTRACT

Disclosed herein is a cooking system: a cooking apparatus configured to input and output a speech, transmit speech data corresponding to the speech, and cook food in a cooking chamber; a first server configured to perform communication with the cooking apparatus, when speech data is received from the cooking apparatus, perform speech recognition based on the received speech data, transmit response information to the speech recognition to the cooking apparatus, obtain a menu requested by the user based on the received speech data, and transmit a cooking time and a cooking temperature for the obtained menu to the cooking apparatus; and a second server configured to store information about at least one recipe for a plurality of menus, perform communication with the first server, and transmit the information about at least one recipe to the first server.

16 Claims, 15 Drawing Sheets

(51) Int. Cl.
*F24C 7/08* (2006.01)
*G10L 15/08* (2006.01)

(52) U.S. Cl.
CPC ........ *G10L 15/08* (2013.01); *G10L 2015/221* (2013.01); *G10L 2015/223* (2013.01)

(58) Field of Classification Search
CPC ... G10L 2015/223; G10L 15/00; G10L 15/26; G10L 15/28; G10L 15/30; G10L 2015/221; G10L 2015/228; G10L 15/08; G10L 21/0208; G06F 16/9035; G06F 3/167; G06F 3/14; G06F 11/07; G06F 11/0736; G06Q 50/12; H04L 65/40; H04L 67/306; H05B 1/02; H05B 6/64; H05B 6/6447

See application file for complete search history.

(56) References Cited

U.S. PATENT DOCUMENTS

| | | | | |
|---|---|---|---|---|
| 2004/0015364 | A1* | 1/2004 | Sulc | G10L 15/26 704/E15.045 |
| 2015/0066516 | A1* | 3/2015 | Nishikawa | F24C 7/08 704/275 |
| 2015/0120320 | A1* | 4/2015 | Fateh | G16H 20/30 705/2 |
| 2018/0202667 | A1* | 7/2018 | Cheng | F24C 7/085 |

FOREIGN PATENT DOCUMENTS

| | | |
|---|---|---|
| EP | 2 851 621 A1 | 3/2015 |
| EP | 3 354 989 A1 | 8/2018 |
| JP | 58-11324 A | 1/1983 |
| JP | 2015-50766 | 3/2015 |
| JP | 2017-54169 | 3/2017 |
| KR | 10-2007-0114991 | 12/2007 |
| KR | 10-2008-0066161 | 7/2008 |
| KR | 10-1647666 | 8/2016 |
| WO | WO 2017/116099 A1 | 7/2017 |

OTHER PUBLICATIONS

Extended European Search Report dated Jul. 10, 2020, in corresponding European Patent Application No. 18852406.0.

Office Action dated May 19, 2022, in Korean Patent Application No. 10-2017-0110771.

Office Action dated Mar. 21, 2022, in European Patent Application No. 18852406.0.

* cited by examiner

COOKING APPARATUS AND COOKING SYSTEM

CROSS-REFERENCE TO RELATED APPLICATIONS

This application is a U.S. National Stage Application which claims the benefit under 35 U.S.C. § 371 of International Patent Application No. PCT/KR2018/005824 filed on May 23, 2018, which claims foreign priority benefit under 35 U.S.C. § 119 of Korean Patent Application No. 10-2017-0110771 filed on Aug. 31, 2017 in the Korean Intellectual Property Office, the contents of both of which are incorporated herein by reference.

TECHNICAL FIELD

Embodiments of the present disclosure relate to a cooking apparatus, and more particularly, to a cooking apparatus and cooking system for cooking food by voice control.

BACKGROUND ART

Generally, cooking apparatuses are apparatuses for heating and cooking foods, and are largely divided into a type using electricity to generate heat for heating food and a type using gas burning to generate heat for heating food.

The cooking apparatus may be classified into a gas range, an oven, an electric range, and the like.

The cooking apparatus includes an input for receiving a command for cooking food, and further includes a display for displaying operation information.

In order to cook food using this cooking apparatus, the user sets cooking temperature and cooking time for cooking food by directly pressing a plurality of setting buttons provided in the input of the cooking apparatus, or selects a menu from the plurality of menu buttons provided in the input.

The cooking temperature and the cooking time set by the user are important factors for flavors of the food. When the set cooking temperature is too low or too high, or when the set cooking time is too short or long, the food is undercooked or burned.

As such, the cooking apparatus has problems that it is somewhat difficult and inconvenient for the user to set the cooking temperature and the cooking time.

Since the cooking time and the cooking temperature are preset for each menu in the cooking apparatus, there is a problem with changes of cooking quality when the ingredients of food are changed for the same menu.

DISCLOSURE

Technical Problem

Therefore, it is an aspect of the present disclosure to provide a cooking apparatus, cooking system, and method of controlling the cooking apparatus, by which spoken data corresponding to a speech signal, when received, to a server, and cooking is performing based on cooking information received from the server.

It is another aspect of the present disclosure to provide a cooking apparatus and cooking system, by which recommendation of at least one of a menu and recipe information based on pre-stored user information is provided, and cooking is performed based on cooking information corresponding to the recipe information.

It is still another aspect of the present disclosure to provide a cooking apparatus and cooking system, which outputs error information of the cooking apparatus and information about measures on the error provided by the server.

Technical Solution

In accordance with one aspect of the present disclosure, a cooking apparatus includes: a communicator configured to perform communication with a server for performing a speech recognition and storing cooking information for each menu; a heating part configured to generate heat to heat food; a sound input configured to receive a speech from a user; a controller configured to control the communicator to transmit speech data corresponding to the received speech to the server, receive cooking information transmitted from the server, and control operation of the heating part based on the received cooking information; and a sound output device configured to output speech data transmitted from the server in voice.

The cooking apparatus may further include an input configured to receive a command to execute a speech recognition mode. When the to execute a speech recognition mode is received through the input, the controller activates operation of the sound input and operation of the sound output device.

The cooking apparatus may further include a circulator configured to circulate the heat generated by the heating part. The controller is configured to control operation of the circulator based on the received cooking information.

The cooking apparatus may further include an input configured to receive a command to set user information. When the command to set the user information is received through the input, the controller is configured to activate operation of the sound input and operation of the sound output device, and control the communicator to transmit speech data corresponding to a speech received when the sound input is operating, to the server as the user information.

The user information includes at least one of identification information of the user, evet information of the user, religion information of the user, and the address information of the user.

The cooking apparatus may further include a display configured to display the received cooking information. When recipe information is received from the server, the controller si configured to control the display to display the received recipe information.

The cooking apparatus may further include a door configured to open or close a cooking chamber; an open/close detector configured to detect an open state and a closed state of the door; and an object detector configured to detect whether or not the cooking chamber contains food. When the door is in the closed state and the food is contained in the cooking chamber, the controller is configured to control the sound output device to output a notification sound corresponding to start of cooking.

In accordance with another aspect of the present disclosure, a cooking system comprising: a cooking apparatus configured to input and output speech, transmit speech data corresponding to the input speech, and cook food in a cooking chamber; and a server configured to perform communication with the cooking apparatus, when the speech data is received from the cooking apparatus, obtain request information of a user, query information of the user, and reaction information of the user corresponding to the received speech data, obtain cooking information based on at least one of the request information of the user, the query information of the user and the reaction information of the user, transmit the obtained cooking information to the cooking apparatus, and transmit response information to the query information to the cooking apparatus.

The cooking information includes a cooking temperature and a cooking time.

The server includes: a first converter configured to convert the received speech data to text data; a natural language recognizer configured to perform natural language recognition on the converted text data, obtain the request information of the user, the reaction information of the user and the query information of the user based on the natural language recognition, and generate response information to the obtained query information; a data portal configured to transmit the obtained request information to a recipe providing server, and receive recipe information from the recipe providing server; and a second converter configured to convert the generated response information into speech data, and transmit the converted speech data to the cooking apparatus.

The server further includes: an error responder configured to obtain measure information for error information of the cooking apparatus, and transmit the obtained measure information to the cooking apparatus.

The server includes: an information storage configured to store user information; a controller configured to obtain information about an optimum recipe from a plurality of recipes based on the request information and the user information, and transmit the obtained optimum recipe information to the cooking apparatus.

The user information includes at least one of identification information of the user, event information of the user, religion information of the user, and address information of the user.

In accordance with another aspect of the present disclosure, a cooking system comprising: a cooking apparatus configured to input and output in voice, transmit speech data corresponding to the voice, and cook food in a cooking chamber; a first server configured to perform communication with the cooking apparatus, when speech data is received by the cooking apparatus, perform speech recognition based on the received speech data, transmit response information corresponding to the speech recognition to the cooking apparatus, obtain a menu requested by the user based on the received speech data, and transmit a cooking time and a cooking temperature of the obtained menu to the cooking apparatus; and a second server configured to store at least one recipe information corresponding to a plurality of menus, perform communication with the first server, and transmit the at least one recipe information to the first server.

The first server may store at least one of identification information of an user, schedule information of the user, religion information of the user, address information of the user, and preference information as user information, and transmit the stored user information to the second server.

The second server identifies the plurality of recipe information corresponding to the menu requested by the user, obtains optimal recipe information among the plurality of recipe information based on the user information, and transmit the obtained optimal recipe information to the first server. The first server transmits the optimum recipe information to the cooking apparatus.

The cooking apparatus includes: a detector to detect an operation state of a plurality of loads; and an error diagnosis unit to determine whether the cooking apparatus is in an error state based on detection information detected by the detector, and when it is determined that the error state, transmit error information to the first server. When the error information is received, the first server obtains measure information corresponding to the error information received, and transmits the obtained measure information to the cooking apparatus.

The first server is configured to obtain information about a preference of the user based on the cooking history of the cooking apparatus. The user preference information includes at least one of a menu name, an amount to be cooked, a degree to which the food is baked, a water content, a level of each flavor, and a texture of food.

The cooking apparatus includes: a sound input to receive a speech signal for the speech of the user; a speech storage to store the received speech signal; a preprocessor to preprocess the stored speech signal to remove noise; and a sound output device to output speech data transmitted by the first server as a speech.

When it is determined that communication with the first server is impossible, the cooking apparatus converts information corresponding to the communication impossibility into speech data, and outputs the converted speech data as a speech.

Advantageous Effects

As is apparent from the above description, a cooking apparatus and a cooking system thereof in accordance with one embodiment of the present disclosure may provide tasty and quality food for the user by obtaining request information of a user by analyzing speech based on a natural language uttered by the user in a server (i.e., the cloud), obtaining cooking information of a food based on the obtained request information and preset user information, and controlling an operation of the cooking apparatus based on the obtained cooking information.

The embodiment of the present disclosure may improve the user's convenience and satisfaction with the cooking apparatus.

The cooking apparatus and cooking system in accordance with another embodiment of the present disclosure may obtain user's preference information for each menu from a history and provide a user-customized menu and recipe based on the obtained user's preference information for each menu.

A cooking apparatus in accordance with another embodiment of the present disclosure may minimize the number of buttons in the cooking apparatus by acquiring the user's request information through speech recognition, thus reducing manufacturing costs of the cooking apparatus, and improve convenience and ease of manipulation by the user because of the simplification of buttons.

Since operation commands are input in voice to a cooking apparatus in accordance with another embodiment of the present disclosure, even weak-eyed users may conveniently use the cooking apparatus.

A cooking apparatus in accordance with another embodiment of the present disclosure may receive error information and associated measure information from a server, allowing the user to easily recognize the error and take actions against the error.

Since the error information is processed by the server, the cooking apparatus may quickly and conveniently take actions against the error.

DESCRIPTION OF DRAWINGS

For a more complete understanding of the present disclosure and its advantages, reference is now made to the following description taken in conjunction with the accompanying drawings, in which like reference numerals represent like parts.

BEST MODE

It will be understood that the term "connect" as herein used or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, etc. may be used herein to describe various elements, these elements should not be limited by these terms. These terms are only used to distinguish one element from another.

It is to be understood that the singular forms "a," "an," and "the" include plural references unless the context clearly dictates otherwise.

Hereinafter, the principle and embodiments of the present disclosure will be described with reference to the accompanying drawings.

Figure 1:
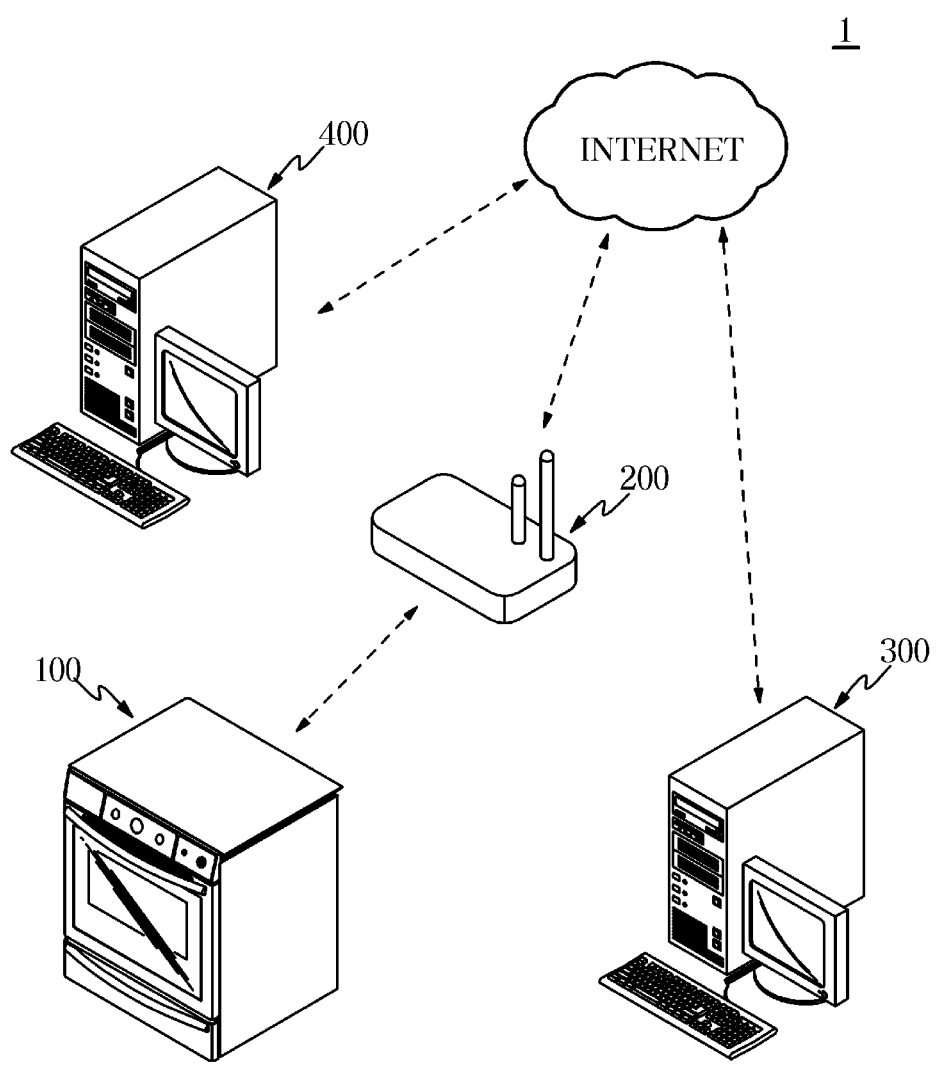
FIG. 1 is a view illustrating a cooking system including a cooking apparatus according to an embodiment.

FIG. 1 is a view illustrating a cooking system including a cooking apparatus according to an embodiment.

A cooking system 1 includes the cooking apparatus 100, an access point (AP) 200, a first server 300 and a second server 400.

The cooking apparatus 100 is a home appliance used at home to perform cooking operation for cooking food based on cooking information transmitted from the first server 300 at a remote place.

Here, the cooking information may include a cooking temperature and a cooking time.

More specifically, the cooking apparatus 100 transmits request information of an user corresponding to a speech input by the user to the first server 300, and when the cooking information is received from the first server 300, controls operation of various loads based on the received cooking information to cook food in a cooking chamber.

The request information may include a menu name, further include an amount to be cooked, a cooking method, the number of servings, and further include preference information such as a degree to which the food is cooked, a water content, a flavor, and a level of each flavor.

The cooking apparatus 100 transmits query information of the user corresponding to a speech input by the user to the first server 300, and when response information is received from the first server 300, may output a speech corresponding to the received response information.

An access point (AP) 200 is a device that may use the Internet. The AP 200 is a device capable of using the Internet, which is a network device connected to an Internet line at home, allowing a plurality of home appliances to share the single Internet line and access the Internet at the same time while transmitting wired or wireless signals.

The AP 200 has an Internet Protocol (IP) address assigned by an Internet service provider, and plays a role of allowing the plurality of home appliances to share the single IP address to access the Internet.

The AP 200 stores a unique IP address of each home appliance in the house for Internet connection.

Specifically, when the cooking apparatus 100 is connected to the AP 200, the AP 200 automatically assigns a unique IP address (virtual IP address or private IP address) to the cooking apparatus 100 so that the cooking apparatus 100 may be connected to the Internet.

The AP 200 performs communication with the cooking apparatus 100 and the first server 300.

Specifically, the AP 200 may transmit various information of the cooking apparatus 100 to the first server 300, and transmit various information of the first server 300 to the cooking apparatus 100.

The cooking system may further include a terminal (not shown) to perform communication between the cooking apparatus 100 and the first server 300. For example, the cooking apparatus 100 accesses the Internet through a communication network of a subscribed communication operator using the terminal without the AP to perform communication with the first server 300.

The terminal may be implemented as a computer or a portable device capable of accessing the cooking apparatus 100 through a network.

Here, the computer includes, for example, a notebook, a desktop, a laptop, a tablet PC, a slate PC, and/or the like, in which a WEB Browser is installed. The portable device is a wireless communication device that is guaranteed with portability and mobility: for example, any type of handheld wireless communication device, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (WiBro), a smart phone, and/or the like, and a wearable device such as a watch, a ring, a bracelet, an ankle bracelet, a necklace, a glasses, a contact lens, or a head-mounted-device (HMD).

The first server 300 is a device to store, integrate and output various information of the cooking apparatus. The first server 300 stores request information and user information of the cooking apparatus corresponding to speech data received from the Internet, obtains cooking information based on at least one of the user information and the request information, and outputs the obtained cooking information.

The first server 300 may store the user information and identification information of the cooking apparatus for each user.

Here, the user information includes basic information such as identification (ID) of the user, sex of the user, and name of the user, living environment information such as address of the user and religion of the user, and event information such as birthday of the user and an anniversary of the user.

In addition, the user information may include preference information such as the user's favorite flavor and texture, further include allergy information of the user, and further include gender information of the user and job information of the user.

The first server 300 may be connected to the AP 200 in the house by the Internet.

The first server 300 may analyze the speech data received from the cooking apparatus 100 to obtain the request information and query information of the user, transmit cooking information corresponding to the obtained request information to the cooking apparatus, and when the query information is obtained from the received speech data, transmit response information to the obtained query information to the cooking apparatus.

The first server 300 may generate preference information of the user based on a history of the cooking apparatus and store the preference information.

The first server 300 may transmit a recommendation menu to the cooking apparatus based on at least one of the request information and the user information, obtain optimum recipe information based on the recommendation menu, obtain cooking information from the recipe information, and transmit the cooking information to the cooking apparatus.

The first server 300 may communicate with the second server 400 through the Internet, and receive recipe information corresponding to a menu from the second server 400.

The second server 400 communicates with the first server 300 through the Internet, obtains recipe information corresponding to a request from the first server 300, and transmits the recipe information to the first server 300.

The second server 400 stores a plurality of menus and at least one piece of recipe information for each menu.

Here, the recipe information may include a menu, ingredients, a cooking time, a cooking temperature, and the like. In addition, the recipe information may further include a level of each flavor such as spicy flavor, sweet flavor, acerbic flavor, bitter flavor, salty flavor.

The second server 400 may periodically update the recipe information for each menu.

The configuration of the cooking apparatus provided in the cooking system will be described in detail with reference to FIGS. 2 to 4.

Figure 2:
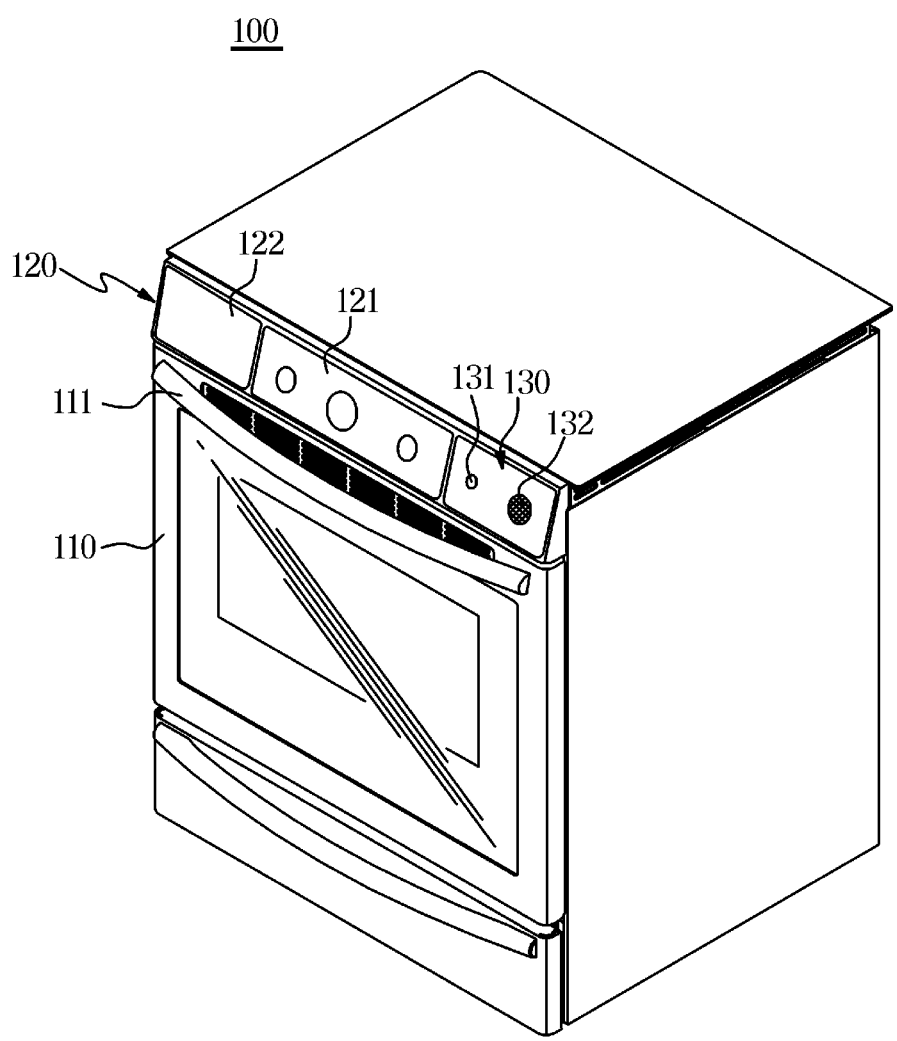
FIG. 2 is a view illustrating an external appearance of a cooking apparatus according to an embodiment.

FIG. 2 is a view illustrating an external appearance of a cooking apparatus according to an embodiment. FIG. 3 is a view illustrating a cooking chamber of the cooking apparatus shown in FIG. 2. FIG. 4 is a side view of the cooking apparatus shown in FIG. 2.

As shown in FIG. 2, the cooking apparatus 100 includes a main body 100a forming the exterior.

Inside the main body 100a, a cooking chamber 100b for forming a cooking space is provided.

Figure 3:
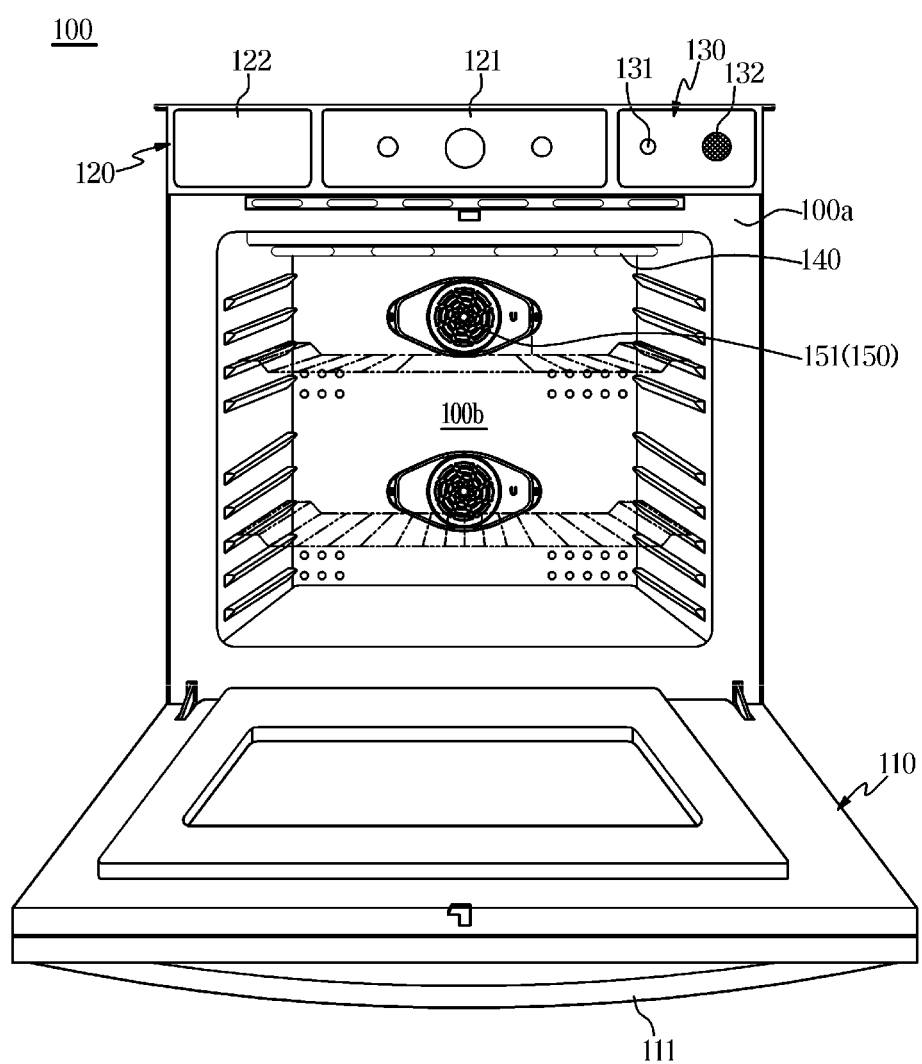
FIG. 3 is a view illustrating a cooking chamber of the cooking apparatus shown in FIG. 2.

As shown in FIG. 3, the cooking chamber 100b may be formed in the shape of a box, and may include an opening formed on the front for food to be taken in and out.

A tray may be detachably mounted in the cooking chamber 100b for the purpose of placing food thereon.

The opening of the cooking chamber may be provided with a door 120 for opening or closing the cooking chamber 100b. Here, the door 100 may be hinged to the main body 100a to be rotatable on the main body 100a.

The door 110 may be provided with a handle 111 gripped by the user, and may further include a transparent glass to allow a user to see into the cooking chamber 100b from outside while the door 110 is closed.

This cooking apparatus cooks the sealed food with a heat (that is, dry heat) generated by a heating part 140, when the cooking chamber 100b is sealed by the door 110 after the food is contained in the cooking chamber 100b.

The cooking apparatus 100 includes a user interface 120 to receive input information and output operation information.

The user interface 120 includes an input 121 to receive the input information to the cooking apparatus from the user, and a display 122 to output the operation information of the cooking apparatus.

The input 121 of the user interface may include a first button to receive a cooking start or stop command, and a second button to select a speech recognition mode.

The first button and the second button may be provided as physical buttons or touch buttons, and receive an on or off command depending on the number of input times.

The input 121 of the user interface may further include a button configured to receive a cooking pause command.

The input 121 and the display 122 of the user interface may be provided as a touchscreen in which a touch panel and a display panel are integrated.

Alternatively, the input 121 of the user interface may be provided in a dial type.

The cooking apparatus further includes a dialog interface 130 provided in the main body 100a to have a dialogue with the user.

The dialog interface 130 includes a sound input 131 to receive a speech of the user and a sound output device 132 to output guidance information and the response information in voice.

Here, the sound input 131 may include a microphone or a microphone array, and the sound output device 132 may include a speaker.

The sound input 131 and the sound output device 132 may be spaced apart from each other by a predetermined distance to reduce signal interference. By separating the sound input 131 and the sound output device 132, an output of the speaker may not interfere with the microphone.

Figure 4:
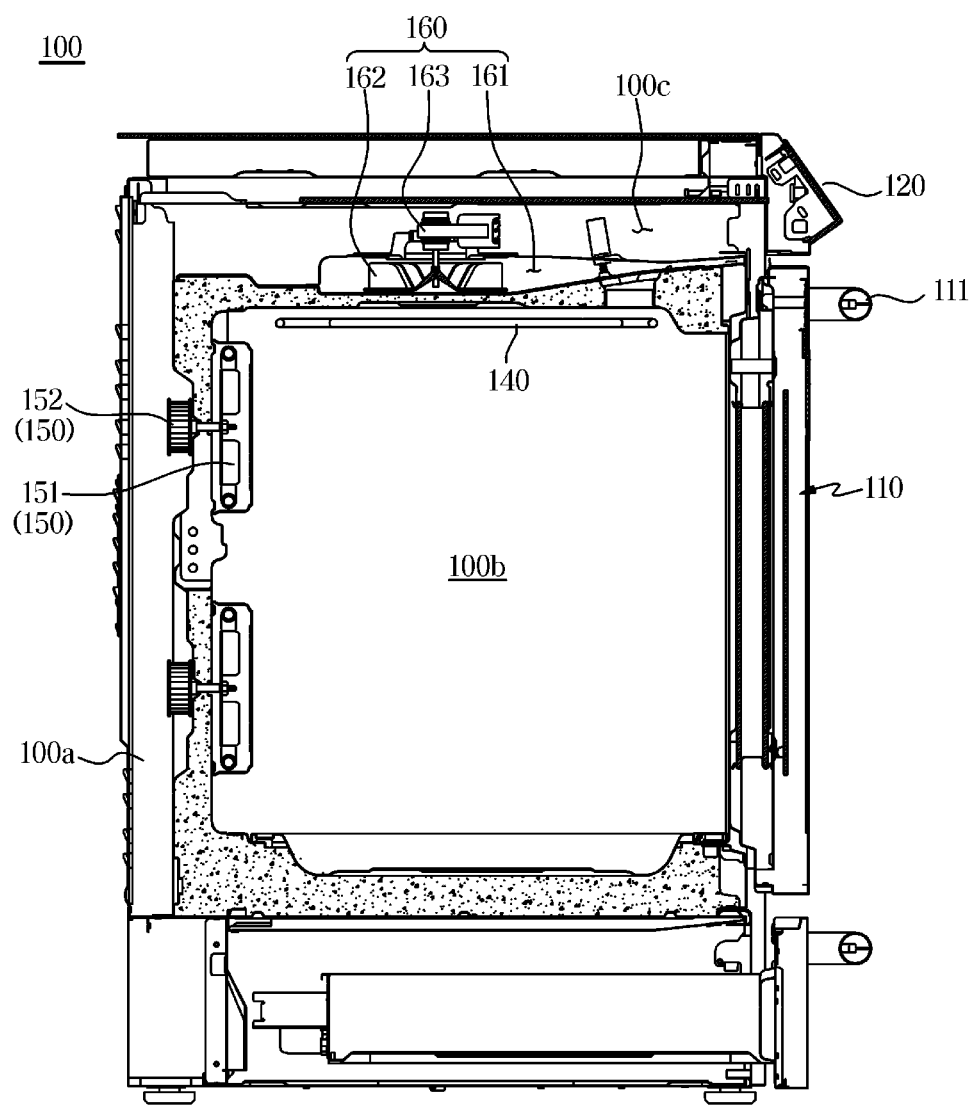
FIG. 4 is a side view of the cooking apparatus shown in FIG. 2.

As shown in FIG. 4, the cooking apparatus 100 includes the heating part 140 disposed to be adjacent to the top of the cooking chamber 100b to generate heat and provide the heat into the cooking chamber 100b, and a circulator 150 configured to circulate the air inside the cooking chamber 100b.

Here, the heating unit 140 may be a heater. The heating unit 140 may include a plurality of heaters.

The cooking apparatus may further include a magnetron (not shown) configured to generate electromagnetic waves to produce heat according to rotation of water molecules inside the food, and a steam part (not shown) configured to generate steam of more than a predetermined temperature.

The circulator 150 circulates the air inside the cooking chamber while food is being cooked.

The circulator 150 includes a circulating fan 151 disposed at a rear surface of the cooking chamber 100b to convert the air inside the cooking chamber 100b, and a circulation motor 152 configured to drive the circulating fan 151.

There may be a plurality of circulating fans 151, and the plurality of circulating fans 151 may be vertically arranged in the cooking chamber.

The circulator 150 may selectively rotate at least one of the plurality of circulating fans based on where the food is placed.

The plurality of circulating fans may be centrifugal fans or turbo fans configured to suck in air from above and discharge the air in a radial direction The cooking apparatus may also control a flow speed of the air circulating inside the cooking compartment by controlling rotational force of the circulation motor 152.

The main body 100a of the cooking apparatus 100 further includes an electric component compartment 100c disposed to be adjacent to the cooking chamber 100b to form a separate space from the cooking chamber 100b, which is filled with various electric components (not shown) such as circuit boards.

In the electric component room 130, an air exhaust duct 161, and a cooler 160 configured to suck in air of the cooking chamber 100b and discharge the air sucked in from the cooking chamber 100b and air of the electric component compartment 100c to the front of the main body 100a may be disposed. The cooler 160 may include a cooling fan 162, and a cooling motor 163 configured to drive the cooling fan 162.

Figure 5:
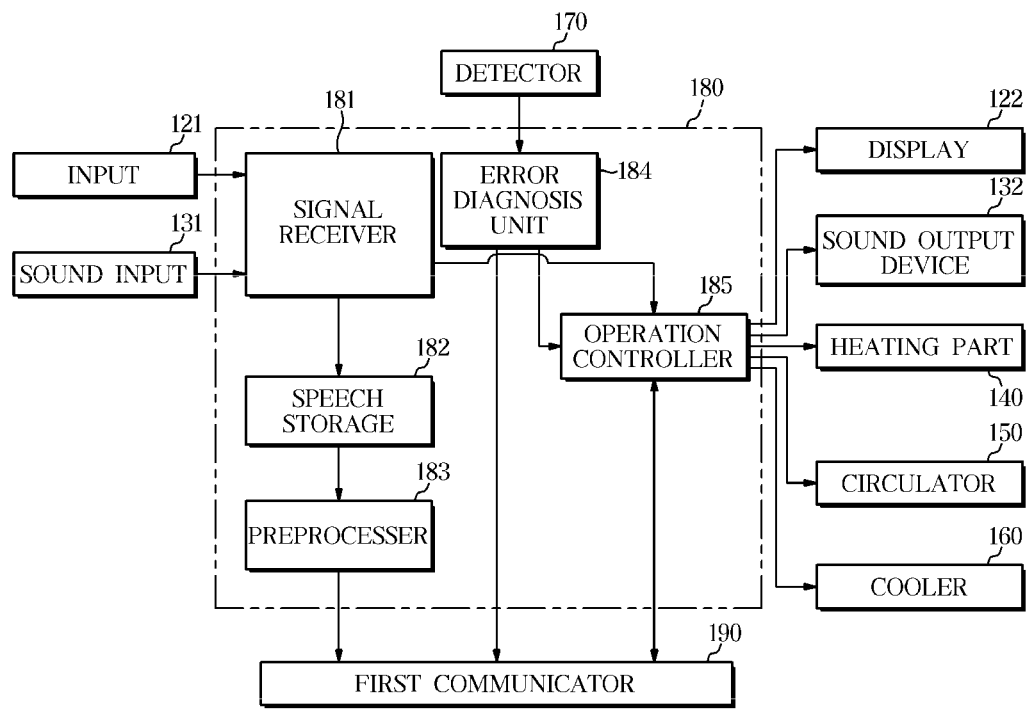
FIG. 5 is a block diagram of a cooking apparatus according to an embodiment.

FIG. 5 is a block diagram of a cooking apparatus according to an embodiment.

The cooking apparatus 1 includes the user interface 120, the dialog interface 130, a plurality of loads 140, 150, 163, a detector 170, a first controller 180, and a first communicator 190.

The user interface 120 includes the input 121 to receive input information to the cooking apparatus from the user, and the display 122 to output operation information of the cooking apparatus.

The operation information includes a cooking mode and the cooking information.

The cooking information includes a cooking temperature and cooking time. The cooking time includes a total cooking time, and may further include at least one of a cooking start time, a cooking elapsed time, a remaining time, and a cooking end time.

The total cooking time may include a preheating time, a main cooking time, and a cooling time of the cooking apparatus.

The operation information is information about a present operation state of the cooking apparatus, which may further include information about preheating, main cooking, and cooling.

The input 121 receives a power-on command of the cooking apparatus, a power-off command of the cooking apparatus, an on command of the speech recognition mode, and an off command of the speech recognition mode.

The input 121 may receive a command to take measures on an error occurring in the cooking apparatus, and may receive a command to request after-service (AS).

The display 122 displays performance information of the speech recognition mode, cooking mode, and cooking information.

The display 122 may display information about measures error information, display a menu being cooked, and display recipe information.

Here, the recipe information may include a menu name, food ingredient information, preparation information for food before cooking, and cooking information. Here, the cooking information may include a cooking temperature and cooking time.

The dialog interface 130 performs a dialogue with the user.

The dialog interface 130 includes the sound input 131 to receive a speech of the user and the sound output device 132 to output guidance information and response information in voice.

Here, the sound input 131 may include a microphone or microphone array, and the sound output device 132 may include a speaker.

The sound output device 132 may output cooking start information, cooking end information, error information, information about measures on an error, and recipe information in voice.

The plurality of loads 140, 150, 163 receive power from a power source (not shown) and converts the received power into energy for cooking food.

The plurality of loads include the heating part 140 to generate heat for heating food, further include the circulator 150 to circulate the heat inside the cooking chamber, and further include the cooler 160 to cool the inside of the cooking chamber after cooking is completed.

Here, the heating part 140 may be a heater, a magnetron, or a steam part.

The circulator 150 may include the circulating fan 151, and the circulation motor 152, and the cooler 160 may include the cooling fan 162, and the cooling motor 133.

That is, the plurality of loads may include at least one of the heater, the magnetron, the steam part, the circulating fan 151, the circulation motor 152, the cooling fan 162, and the cooling motor 163.

The detector 170 detects information regarding a cookable state of the cooking apparatus.

The detector 170 may include a door opening/closing detector configured to detect an open or closed state of the door, and an object detector configured to detect the existence of an object in the cooking chamber to determine whether or not the cooking chamber contains food.

The door opening/closing detector may include a contact sensor or a non-contact sensor.

In a case that the door opening/closing detector is a contact sensor, the door opening/closing detector may be of a push type (for example, a limit switch, a micro-switch, or the like).

In a case that the door opening/closing detector is a non-contact sensor, the door opening/closing detector may be an optical sensor, a proximity sensor, or the like.

The detector 170 may further include a cooking chamber temperature detector configured to detect temperature of the cooking chamber, and a food temperature detector configured to detect temperature of food.

The cooking chamber temperature detector and the food temperature detector may include, but be not limited to, one of a resistance temperature detector thermometer, a thermistor thermometer, a thermocouple thermometer, and an integrated circuit (IC) thermometer.

The first controller 180 receives signals from the input 121 and the sound input 131, and controls operations of the first communicator, the plurality of loads 140, 150, 163, the sound output device 132, and the display 122 based on the received signal.

The first controller 180 includes a signal receiver 181, a speech storage 182, preprocessor 183, an error diagnosis unit 184, and an operation controller 185.

The signal receiver 181 receives a signal corresponding to each of the power-on command of the cooking apparatus, the power-off command of the cooking apparatus, the on command of the speech recognition mode, and the off command of the speech recognition mode input to the input 121, and transmits the received signal to the operation controller 185.

The signal receiver 181 may receive a signal corresponding to command to set user information through the input 121.

The signal receiver 181 transmits a speech signal corresponding to the user's speech input to the sound input 131 to the speech storage 182.

The speech storage 182 stores the speech signal and transmits the speech signal to the preprocessor 183.

The speech storage 182 may be implemented as at least one of a non-volatile memory device such as a cache, a read only memory (ROM), a programmable ROM (PROM), an erasable programmable ROM (EPROM), an electrically erasable programmable ROM (EEPROM), Flash memory, a volatile memory device such as Random Access Memory (RAM), or a storage medium such as a hard disk drive (HDD) and a CD-ROM, but not limited thereto.

The speech storage may be a memory implemented in a separate chip from the processor as described above in relation to the first controller, or may be implemented in a single chip with the processor.

The preprocessor 183 removes noise in the speech signal by processing the speech signal, and transmits spoken data with the noise eliminated to the first communicator 190.

The error diagnosis unit 184 determines whether the cooking apparatus is in an error state based on detection information detected through the detector 170 before and during a cooking operation of the cooking apparatus, when the cooking apparatus is in the error state, transmit the error information to the first communicator 190, and when the cooking apparatus is in a normal state, transmits normal state information to the operation controller 185.

The error state may include a state in which the door is opened, no food is contained, the cooking chamber is overheated, the circulating fan is not operated, the cooling fan is not operated, and/or the like.

When a signal corresponding to the power-on command of the cooking apparatus is received, the operation controller 185 activates operation of various components, when a signal corresponding to the on command of the speech recognition mode is received, activates operation of the sound input 131 and the sound output device 132, and when a signal corresponding to the off command of the speech recognition mode is received, deactivates the operation of the sound input 131 and the sound output device 132.

When the speech data corresponding to the received voice is a trigger voice, the operation controller 185 may conduct a dialogue with the first server 300 for cooking.

When the cooking start command is received, the operation controller 185 determines whether or not the cooking chamber contains food based on the detection information of the detector 170, when it is determined that the food is contained, determines whether the door is in the closed state, and when it is determined that the door is in the closed state, controls operation of the plurality of loads based on the cooking information received through the first communicator 190.

The operation controller 185 may transmit operation performance information corresponding to the cooking information to the first server. That is, the operation controller 185 informs the first server that the cooking operation is performed based on the cooking information provided by the first server.

When a signal corresponding to the setting command of the user information is received, the operation controller 185 activates the sound input 131, transmits speech data corresponding to the received speech to the first server 300, and may transmit both the speech data and the command to set the user information.

The operation controller 185 controls operation of the heating part 140 and controls the operation of the circulator based on the cooking information received through the first communicator 190, and when it is determined that the cooking is completed, controls operation of the cooler 160.

That is, the operation controller 185 controls the ON operation of the heating part so that the temperature of the cooking chamber detected by the cooking chamber temperature detector (not shown) reaches the received cooking temperature, controls the ON or OFF operation of the heating part 140 based on the temperature of the cooking chamber 100b detected by the cooking chamber temperature detector so that the temperature of the cooking chamber 100b is maintained at a predetermined cooking temperature, counts the elapsed time during cooking, and when the counted elapsed time reaches the cooking time, controls the heating part. to be off.

The operation controller 185 controls operation of the circulator during the cooking operation to move the heat inside the cooking chamber. Specifically, the operation controller 185 controls the circulation motor 152 so that the hot air generated by the heating part 140 is uniformly transferred to the interior of the cooking chamber 110.

The operation controller 185 controls driving of the cooling motor 163 during the cooking operation so as to cool off the electric component compartment, thereby protecting the electric components in the electric component compartment.

The operation controller 185 operates the cooling motor of the cooler to lower the temperature inside the cooking chamber when cooking is completed.

The operation controller 185 may determine whether the cooking chamber is in an overheated state, and determine whether the cooling fan or the circulating fan is in an error state or in a normal state based on the detection information of the detector 170 during the cooking operation.

When the speech data is received through the first communicator, the operation controller 185 controls operation of the sound output device 132 to output speech based on the received speech data Here, the speech data may correspond to the response information, the measure information, the guidance information, and the recipe information.

When a registration command is input through the input 121, the first controller 180 controls the first communicator to perform communication with the first server, and transmits the identification information of the cooking apparatus to the first server.

The first controller 180 periodically checks a state of the Internet connection and may control an output of communication impossibility information through the display 122 or the sound output device 132 when the Internet connection is in disabled state.

The first controller 180 may further include a converter (not shown, TTS) for converting text data to speech data, convert the communication impossibility information to speech data using the converter, and control the operation of the sound output device to output the converted speech data in voice.

The first controller 180 includes a memory (not shown) that stores algorithms for controlling operation of the cooking apparatus components or data regarding a program that implements the algorithms and a processor (not shown) that performs the above-described operations using the data stored in the memory. The memory and the processor may be implemented in separate chips. Alternatively, the memory and the processor may be implemented in a single chip.

The first controller 180 may be Central Processing Unit (CPU), Micro Controller Unit (MCU) or Processor.

The first controller 180 stores a control program for controlling the cooking apparatus 100, a graphical user interface (GUI) related to an application downloaded from a server or provided by a manufacturer, images for providing the GUI, user information, a document, databases or related data.

The first communicator 190 communicates with the first server 300 through the AP 200, and transmits the speech data to the first server 300 based on a command from the first controller 300, and when the speech data is received from the first server 300, transmits the received speech data to the operation controller 185 of the first controller 180.

When the first communicator 190 receives cooking information from the first server 300, the first communicator 190 transmits the received cooking information to the operation controller 185 of the first controller 180.

The first communicator 190 may include one or more components that enable communication with the first server, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, an Radio Frequency Identification (RFID) communication module, a Wireless Local Access Network (WLAN) communication module, a near field communication (NFC) module, a Zigbee communication module, and the like.

The wired communication module may include not only various wired communication modules, such as a local area network (LAN) module, a wide area network (WAN) module or a value added network (VAN), but also various cable communication modules, such as Universal Serial Bus (USB) module, a high definition multimedia interface (HDMI), a digital visual interface (DVI), a recommended standard 232 (RS-232), a power line communication, or a plain old telephone service (POTS), and the like.

The wireless communication module includes any wireless communication modules that support various communication methods, such as a WiFi module, a Wireless broadband (Wibro) module, a Global System for Mobile Communication (GSM) module, a Code Division Multiple Access (CDMA) module, a Wideband Code Division Multiple Access (WCDMA) module, a universal mobile telecommunications system (UMTS) module, Time Division Multiple Access (TDMA) module, Long Term Evolution (LTE) module, and the like.

Figure 6:
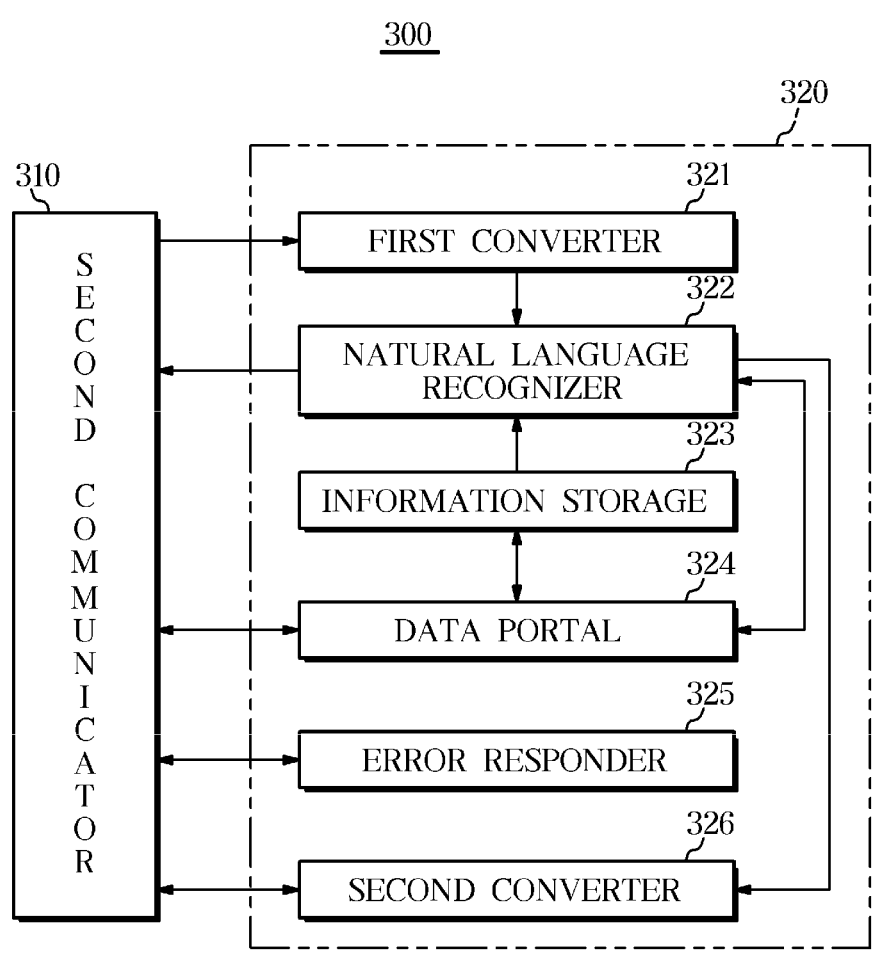
FIG. 6 is a block diagram of a first server 300 that performs communication with a cooking apparatus according to an embodiment.

FIG. 6 is a block diagram of a first server 300 that performs communication with a cooking apparatus according to an embodiment.

The first server 300 includes a second communicator 310 and a second controller 320. In addition, the first server 300 may further include an input (not shown) and a display (not shown).

The second communicator 310 communicates with the cooking apparatus 100 through the AP 200.

The second communicator 310 transmits and receives speech data between the cooking apparatus 100 and the first server 300, and transmits cooking information to the cooking apparatus 100 according to a command of the second controller.

The second communicator 310 communicates with the second server 400 that provides a recipe.

Specifically, the second communicator 310 transmits information about the user's request to the second server, and when the recipe information is received from the second server, transmits the received recipe information to the second controller.

The second communicator 310 may transmit both the request information and the user information when transmitting the request information of the user.

The second communicator 310 communicates with the cooking apparatus 100 through a terminal (not shown).

The second communicator 310 may receive user information and identification information of the cooking apparatus from the terminal.

The second controller 320 obtains request information of the user based on the received speech data, when the request information is obtained, obtains the cooking information corresponding to the request information, controls the second communicator to transmit the obtained cooking information to the cooking apparatus, generates response information in response to the query information, and controls the second communicator to transmit the generated response information to the cooking apparatus.

The second controller 320 may obtain request information of the user from dialog information of a dialogue with the user until the cooking start command is input from the user.

Here, the dialog information may include response information of the first server and reaction information of the user to the response of the first server.

That is, the second controller may obtain the request information of the user based on the response information and the reaction information to the response information.

The second controller 320 may control the second communicator to obtain recipe information corresponding to the request information and to transmit the obtained recipe information to the cooking apparatus.

The recipe information may include a menu name, food ingredient information, preparation information before cooking food, and cooking information. Here, the cooking information may include a cooking temperature and cooking time.

The second controller 320 obtains optimum recipe information from among a plurality of recipes based on the request information of the user received from the cooking apparatus and the prestored user information, and transmits the obtained optimum recipe information to the cooking apparatus.

For example, when the request information of the user is 'pizza baking', the second controller 320 transmits a cooking temperature and cooking time for baking pizza to the cooking apparatus as the cooking information.

In another example, when the request information of the user is the 'pizza baking' and the religion information of the user information is 'Buddhist', the second controller 320 transmits a cooking temperature and time for cooking a vegetarian pizza to the cooking apparatus as the cooking information.

In another example, when the request information of the user is 'provide pizza recipe' and the religion information of the user information is 'Buddhist', the second controller 320 transmits 'recipe information of vegetarian pizza' to the cooking apparatus, and when the request information of the user is 'start cooking', transmits a cooking temperature and time for the vegetarian pizza to the cooking apparatus as the cooking information.

In another example, when the request information of the user is 'provide pizza recipe for one serving' and the religion information of the user information is 'Buddhist', the second controller 320 transmits 'pizza recipe information for a single serving' to the cooking apparatus, and when the request information of the user is 'start cooking', transmits a cooking temperature and time for the vegetarian pizza for one serving to the cooking apparatus as the cooking information.

In another example, when the request information of the user is 'provide pizza recipe for one serving' and the religion information of the user information is 'Hindus', the second controller 320 obtains recipe information by excluding beef from the 'pizza recipe information for one serving', transmits the obtained recipe information to the cooking apparatus, and when the request information of the user is 'start cooking', transmits a cooking temperature and time for the pizza excluding beef to the cooking apparatus as the cooking information.

In another example, if the request information of the user is 'provide menu' and the event information of the user information is 'birthday', the second controller 320 transmits a menu name (cake) of a food to be eaten on the birthday to the cooking apparatus, and when the request information of the user is 'start cooking', transmits a cooking temperature and time for baking cake to the cooking apparatus as the cooking information.

In another example, when the request information of the user is 'provide menu' and the preference information of the user information is 'crunchy cookie', the second controller 320 transmits 'crunchy cookie' to the cooking apparatus as a recommendation menu name.

In another example, when the request information of the user is 'provide menu', the address information of the user information is 'the United States (US)' and the event information is 'Thanksgiving Day', the second controller 320 transmits 'turkey dish' to the cooking apparatus as a recommendation menu name.

In another example, when the request information of the user is 'provide a pizza recipe' and flavor level information of the user information is 'level 4 of five levels of spicy flavor', second controller 320 obtains spicy pizza recipe information, and transmits the obtained recipe information to the cooking apparatus.

The second controller 320 obtains the measure information for the received error information, and controls the second communicator to transmit the obtained measure information to the cooking apparatus.

The second controller 320 stores the menu name, the recipe information, and the cooking information, which are used for cooking in the cooking apparatus, as a cooking history, and generates and stores the preference information of the user based on the stored menu name, recipe information, cooking information.

The second controller 320 may include a first converter 321, a natural language recognizer 322, an information storage 323, a data portal 324, an error responder 325, and a second converter 326.

The first converter 321 converts the received speech data to text data and transmits the text data to the natural language recognizer 322.

The first converter 321 includes Automatic Speech Recognition (ASR) for automatically recognizing voice.

The natural language recognizer (or NLU: Natural Language Understanding) 322 converts text data into a computer language, obtains the request information requested by the user based on the converted computer language, and transmits the obtained request information to the data portal 324.

The natural language recognizer 322 performs the speech recognition mode and has a dialogue with the user when it is determined that the received speech data is a trigger voice.

The natural language recognizer 322 may obtain user information from the information storage 323, and may transmit both the obtained user information and the request information to the data portal 324.

That is, the natural language recognizer 322 requests the second server to provide recipe information.

When the recipe information is received from the data portal 324, the natural language recognizer 322 transmits the received recipe information to the cooking apparatus.

The natural language recognizer 322 may obtain cooking information from the recipe information, and transmit the obtained cooking information to the cooking apparatus.

When information about a plurality of recipes is received from the second server, the natural language recognizer 322 may obtain optimum recipe information from the plurality of recipes based on the user information and the request information of the user, and may transmit the optimum recipe information to the cooking apparatus.

When it is determined that the received speech data is query information, the natural language recognizer 322 generates response information to the query information, and transmits the response information to the second converter 326.

The information storage 323 stores the user information.

The user information may be information transmitted from the cooking apparatus, information transmitted from the terminal, and information stored in a predetermined website or application (i.e., an app).

Here, the user information includes basic information such as ID of the user, sex of the user, and name of the user, living environment information such as address of the user and religion of the user, and event information such as birthday of the user and an anniversary of the user.

The user information may include preference information such as the user's favorite flavor and texture, a level of each flavor, further include allergy information of the user, and further include sex information of the user, job information of the user and a medical history of the user.

The data portal 324 may perform interworking with the terminal and receive the user information stored in the terminal.

The data portal 324 transmits the request information to the second server 400 and transmits the user information to the second server 400.

The data portal 324 may transmit information about at least one recipe received from the second server 400 to the natural language recognizer 322.

The data portal 324 may be provided in the second communicator 310.

The error responder 325 stores information about measures on a plurality of errors, identifies measures information for the received error information, and transmits the identified measures information to the cooking apparatus.

The second converter 326 converts response data recognized by the natural language recognizer to speech data, and transmits the speech data to the cooking apparatus.

The second converter 326 may convert the recipe information into speech data and transmit the speech data to the cooking apparatus.

The second converter 326 includes an automatic Text To Speech (TTS) converter.

The second server 400 stores recipe information corresponding to the plurality of menus, and may store at least one recipe information for each menu.

The second server 400 obtains a menu corresponding to the request information from among the plurality of menus and transmits name of the obtained menu to the first server.

The second server 400 may transmit information about the plurality of recipes corresponding to the request information to the first server.

The second server 400 obtains optimal recipe information corresponding to the request information from among the plurality of recipes, and transmits the optimum recipe information to the first server 300.

The second server 400 obtains optimum recipe information corresponding to the request information and the user information from among the plurality of recipes, and transmits the optimal recipe information to the first server 300.

At least one component may be added or eliminated according to the performance of the components of the cooking apparatus and the first server shown in FIGS. 5 and 6, respectively. It will be readily understood by those skilled in the art that the mutual positions of the components may be changed depending on the performance or structure of the system.

Each of the components shown in FIGS. 5 and 6 may be software and/or hardware components such as a Field Programmable Gate Array (FPGA) and an Application Specific Integrated Circuit (ASIC).

Figure 7:
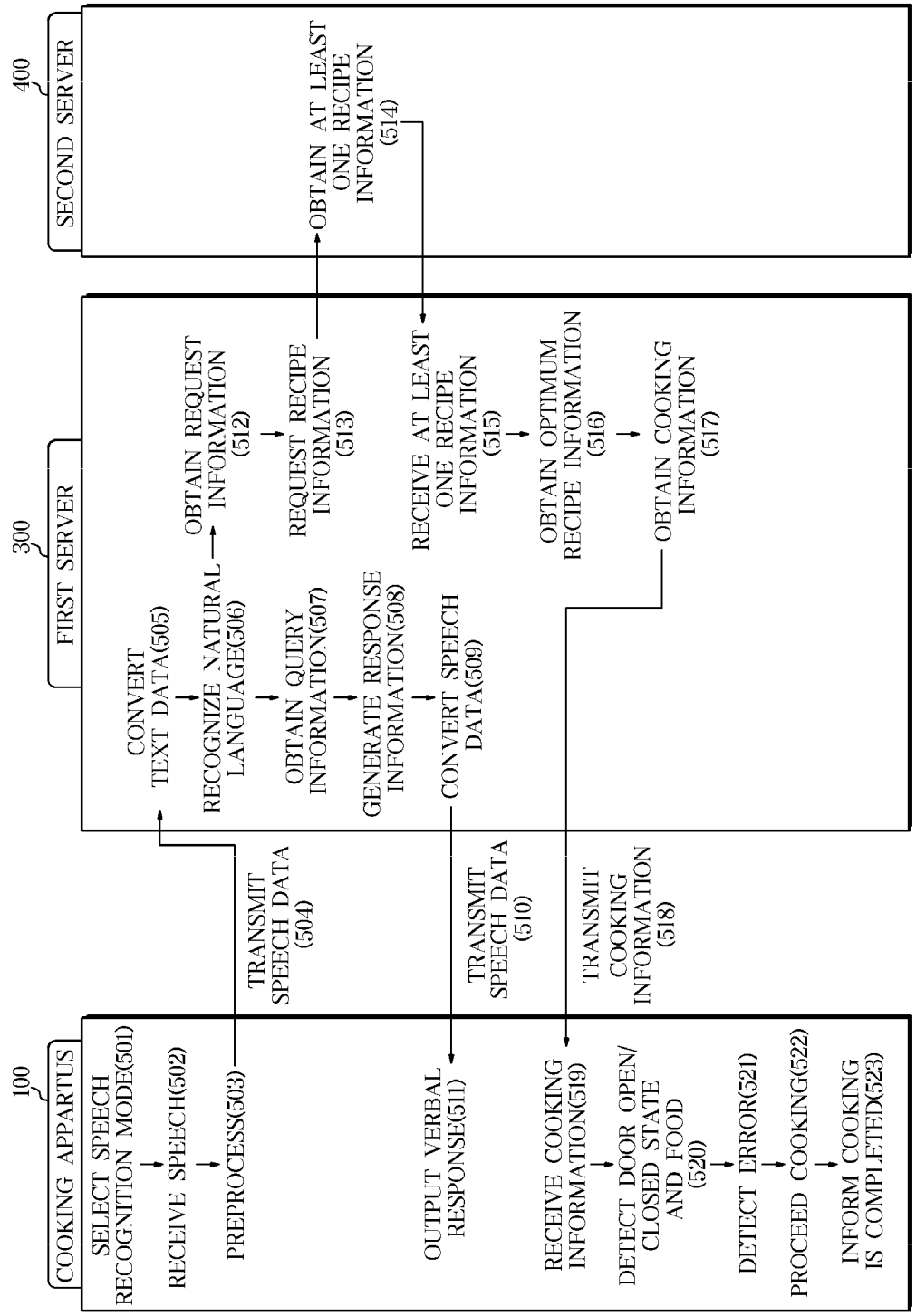
FIG. 7 is a view illustrating transmission and reception of information in a cooking system including a cooking apparatus according to an embodiment.

FIG. 7 is a view illustrating transmission and reception of information in a cooking system including a cooking apparatus according to an embodiment.

When the power-on command is received, the cooking apparatus supplies power to its various components.

When a speech recognition mode of an input is selected (501), the cooking apparatus performs the speech recognition mode. At this time, the cooking apparatus activates the sound input, the sound output device and the first communicator.

In addition, when the power is turned on, the cooking apparatus activates the sound input, the sound output device, and the first communicator, and when it is determined that a trigger voice is received, may perform the speech recognition mode.

When a speech signal is received through the sound input (502), the cooking apparatus removes noise from the speech signal by performing preprocessing of the received speech signal (503), and transmits speech data corresponding to the speech signal with the noise removed to the first server (504).

When the speech data is received, the first server 300 converts the received speech data to text data (505), converts the text data into a computer language, and recognizes a natural language based on the computer language (506).

The first server 300 determines whether the recognized natural language includes a request of a user or a query of the user.

When it is determined that the recognized natural language includes the query of the user, the first server obtains 300 query information of the user based on the recognized natural language (507), and generates response information to the query information (508). At this time, the response information may be in a computer language. Accordingly, the first server converts the response information from the computer language to text data, and converts the text data to speech data.

That is, the first server 300 converts the generated response information into speech data, and transmits the speech data to the cooking apparatus (510).

At this time, when the speech data is received, the cooking apparatus outputs a verbal response to the speech data through the sound output device, the speaker (511).

When it is determined that the recognized natural language includes the request of the user, the first server 300 obtains request information of the user based on the recognized natural language (512), and transmits the request information to the second server 400, thereby requesting recipe information (513).

When the request information is received, the second server 400 identifies a menu name in the received request information, obtains information about at least one recipe for the identified menu (514), and transmits the information about at least one recipe for the menu to the first server 300.

For example, the second server may obtain at least one of menu name, an amount to be cooked, number of servings, and preference information from the request information, and obtain recipe information corresponding to the at least one information.

The first server 300 receives the at least one recipe information (515).

When the received recipe is in the plural, the first server 300 obtains an optimum recipe from among the plurality of recipes based on user information (516), and obtains cooking information based on the optimum recipe information (517), and transmits the cooking information to the cooking apparatus (518).

The first server 300 may obtain the optimal recipe from among the plurality of recipes based on at least one of an address, a religion, and an event of the user.

When the cooking information is received (519), the cooking apparatus displays the recipe information on the display 122, detects an open or closed state of the door and a state of whether a food is contained (520), and determines an error based on the open or close state of the door and the state of whether a food is contained (521).

When it is determined that no food is contained in the cooking chamber, or the door is in the open state, the cooking apparatus may output the error information through the display or the sound output device.

When it is determined that the food is contained in the cooking chamber and the door is in the closed state, the cooking apparatus proceeds cooking of the food based on the cooking information (522), and when it is determined that the cooking of the food is completed, gives notification of completion of the cooking (523).

The notification of completion of the cooking includes displaying the notification information on the display 122 or outputting the notification information through the sound output device 132 in sound.

In addition, the first server may transmit both the request information and the user information to the second server (400). At this time, the second server may obtain an optimal recipe for a menu, which is requested by the user, based on the request information and the user information, transmit the optimal recipe to the first server 300.

The control configuration of a cooking apparatus in the cooking system will be described in detail with reference to FIGS. 8A and 8B.

Figure 8A:
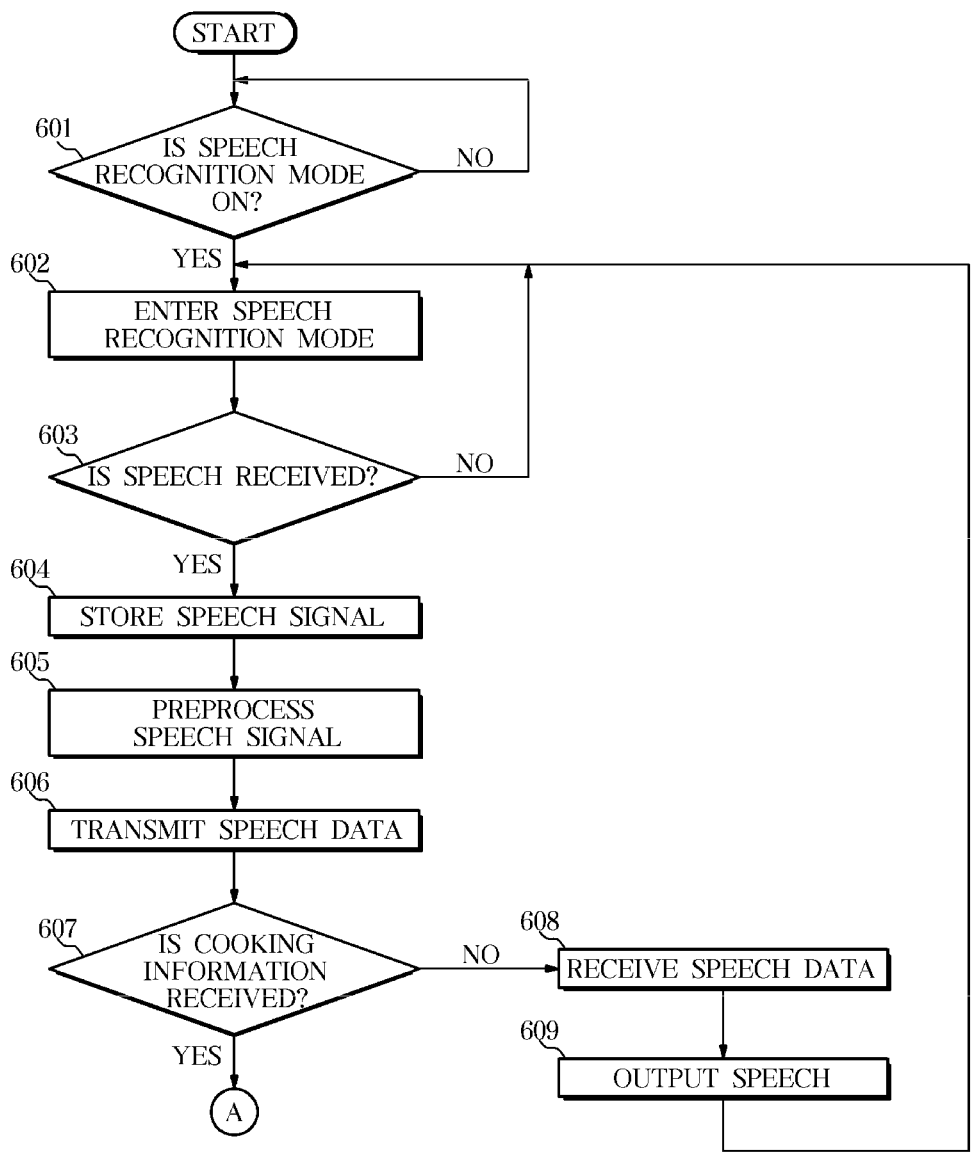
FIGS. 8A and 8B are a flowchart for controlling cooking operations of the cooking apparatus according to an embodiment.
Figure 8B:
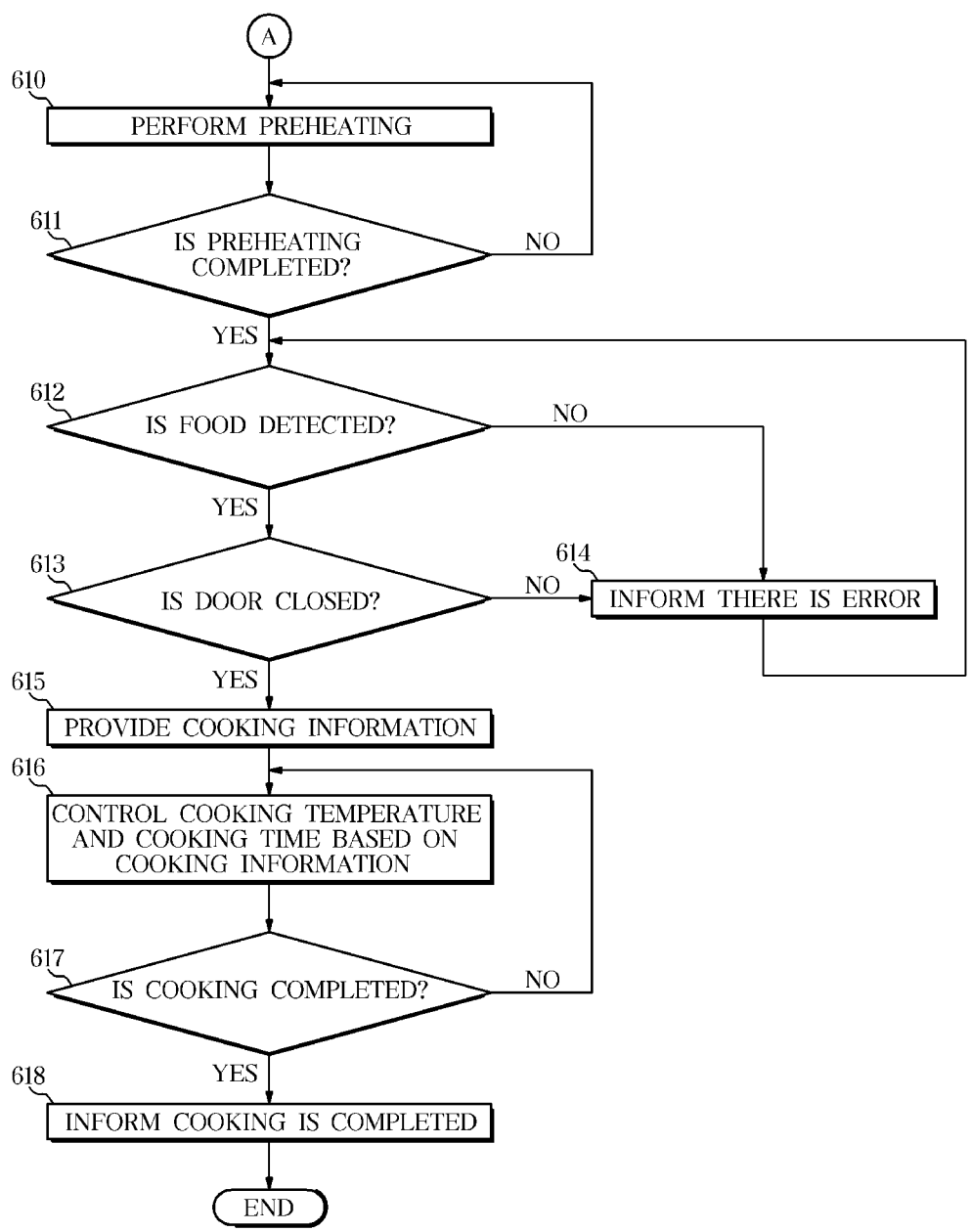

FIGS. 8A and 8B are a flowchart of a method for controlling cooking operation of a cooking apparatus according to an embodiment, which will be described in more detail with reference to FIGS. 9 to 12.

Figure 9:
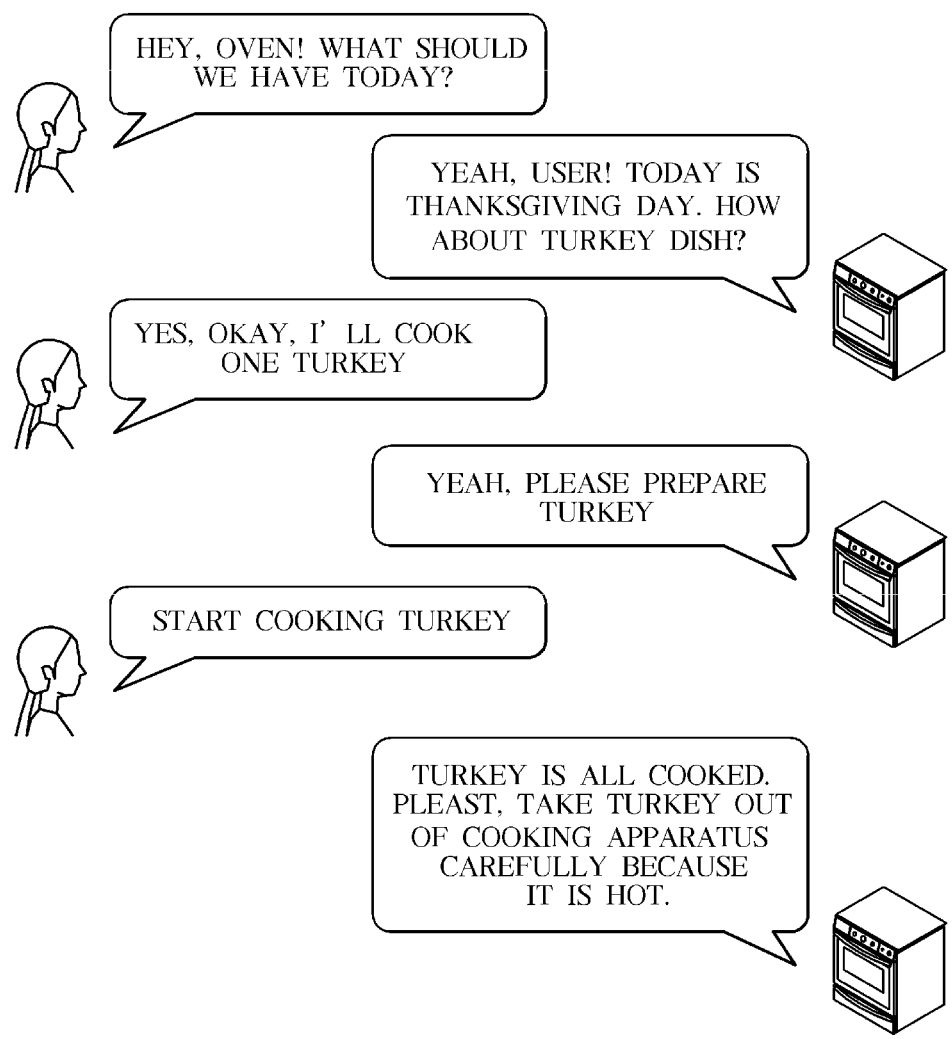
FIGS. 9, 10, 11 and 12 illustrate dialogues with a user for controlling cooking operations of the cooking apparatus according to an embodiment.
Figure 10:
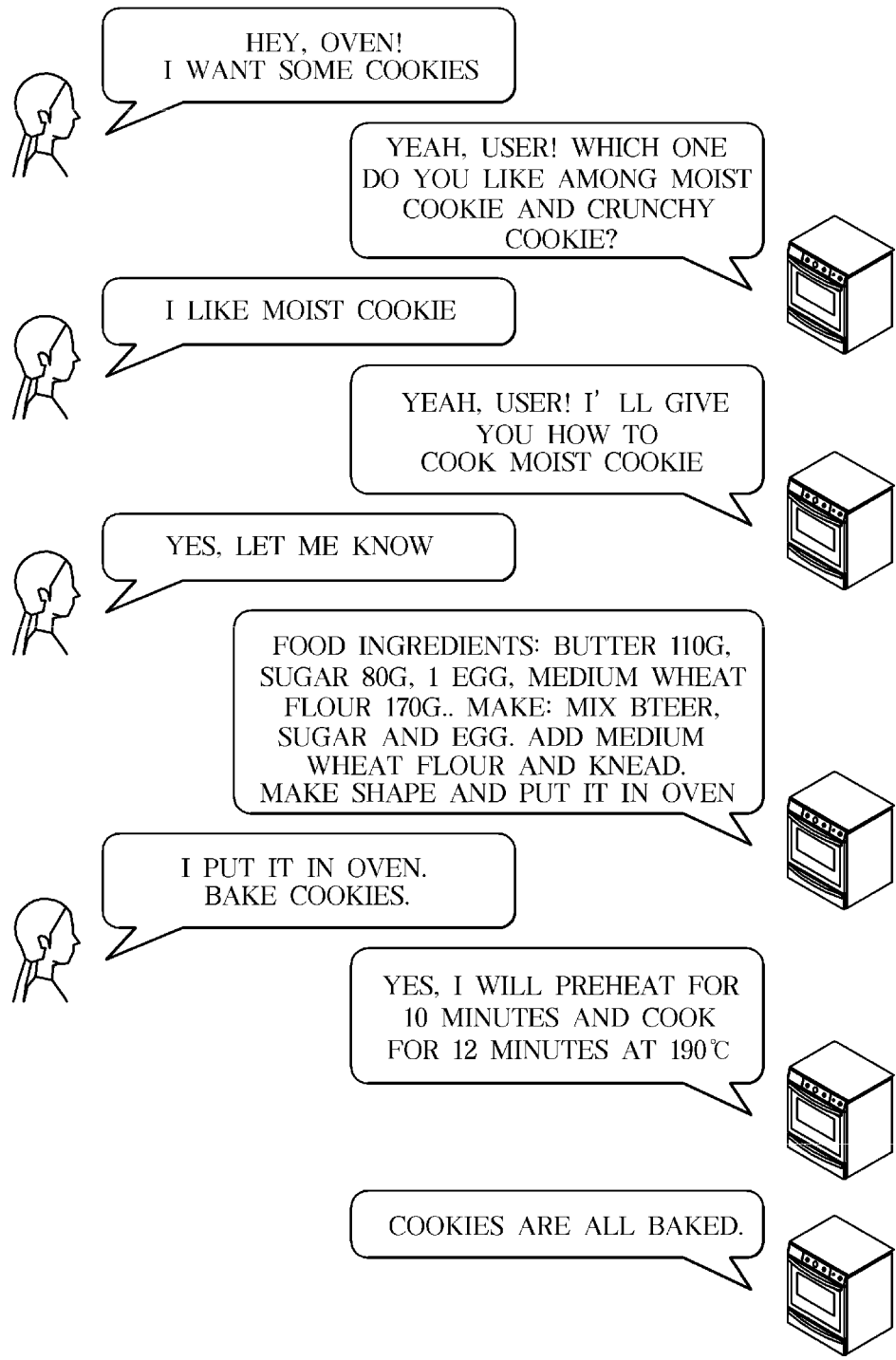
Figure 11:
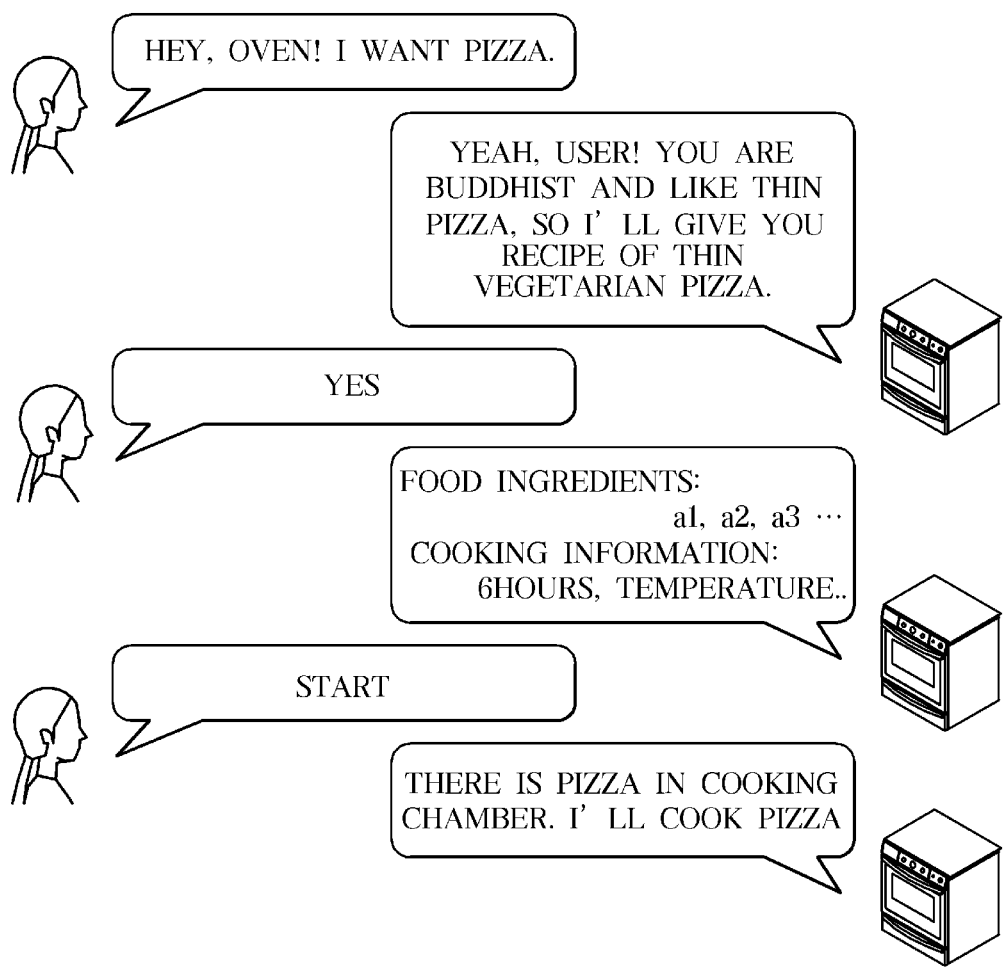

FIGS. 9, 10, 11 and illustrate dialogues between an user and a cooking apparatus for controlling cooking operation of the cooking apparatus according to an embodiment.

When the speech recognition mode is on (601), the cooking apparatus enters the speech recognition mode (602).

Here, the entering of the speech recognition mode may include activating the sound input, the sound output device, and the first communicator.

When the speech is received through the sound input 131 (603), the cooking apparatus stores a speech signal corresponding to the received speech (604), preprocesses the stored speech signal (605), and transmits speech data corresponding to the preprocessed speech signal to the first server 300 (606).

Here, the preprocessing of the speech signal includes removing noise from the speech signal.

At this time, when it is determined that the speech received by the cooking apparatus is a trigger voice, the first server 300 starts the speech recognition mode. That is, the first server 300 may start a dialogue with the user through the cooking apparatus.

The cooking apparatus transmits the speech data corresponding to the speech signal received by the sound input to the first server, and start the dialogue with the user by outputting the speech data transmitted from the first server through the sound output device.

The cooking apparatus determines whether the cooking information is received from the first server (607).

When it is determined that speech data is received from the first server (608), the cooking apparatus outputs a speech corresponding to the speech data received through the sound output device (609).

When a speech signal corresponding to the output speech is received, the cooking apparatus transmits speech data corresponding to the received speech signal back to the first server.

Thus, the cooking apparatus may have a dialogue with the user until the cooking information is received from the first server. Also, the cooking apparatus may have a dialogue with the user until a cooking start command is input from the user.

Here, having the dialogue with the user includes performing inputting and outputting of speech in the cooking apparatus. The cooking apparatus may output a verbal response based on the speech recognition result of the first server.

In addition, the first server may obtain cooking information based on the dialog information with the user, and transmit the cooking information to the cooking apparatus.

When it is determined that the cooking information is received from the first server, the cooking apparatus performs a preheating of the cooking chamber by controlling the heating part based on the received cooking information (610).

When it is determined that recipe information is received from the first server, the cooking apparatus displays the recipe information on the display 122. Also, the cooking apparatus may output the recipe information in voice through the sound output device 132.

When it is determined that the preheating time elapses based on the cooking information, the cooking apparatus completes the preheating (611), detects food by determining whether or not the cooking chamber contains food, and when it is determined that the food is contained (612), determines whether the door is in the closed state by detecting the open/close state of the door (613).

When it is determined that no food is contained in the cooking chamber or that the door is in the open state, the cooking apparatus determines that it is in an error state. When no food is contained in the cooking chamber, the cooking apparatus outputs an error notification indicating that food should be put in (614). When it is determined that the door is in the open state, the cooking apparatus outputs an error notification indicating that the door should be closed (614).

When it is determined that the food is contained in the cooking chamber and the door is in the closed state, the cooking apparatus provides cooking information for cooking food (615), and controls a cooking temperature and time based on the cooking information (616) so that the food in the cooking chamber is cooked.

Providing the cooking information includes displaying the cooking temperature and time on the display. The cooking time may be total cooking time excluding preheating time, which may include main cooking time and cooling time.

The cooking apparatus determines whether or not the cooking of the food is completed based on the cooking time (617), when it is determined that the cooking of the food is completed, the cooking apparatus outputs notification information indicating the completion of the cooking of the food (618).

The notification information indicating the completion of the cooking includes displaying cooking completion information on the display or outputting the cooking completion information in voice through the sound output device.

FIGS. 9, 10, 11 and 12 illustrate dialogues between a user and a cooking apparatus for controlling cooking operations of the cooking apparatus according to an embodiment. This is an example in which a cooking apparatus receives cooking information for each menu or recipe information for each menu corresponding to the request information from the speech of the user and previously stored user information, and outputs the received information.

As shown in FIG. 9, when the user speaks a query together with a trigger word ('Hey, oven'), the cooking apparatus performs the speech recognition mode using the first server, and outputs a verbal response to the query s from the user based on a command of the first server.

At this time, the cooking apparatus may output the verbal response ('turkey dish') corresponding to an event ('Thanksgiving Day') of the user information according to the command of the first server.

When the user speaks a request for an amount to be cooked ('One') with a reaction word ('Yes') that accepts the verbal response, the cooking apparatus transmits the speech data to the first server. After that, the cooking apparatus receives cooking information (i.e., cooking time and temperature) for cooking one turkey from the first server, and outputs the cooking information with a guidance voice ('prepare turkey') to the user.

After that, when the user speaks the cooking start command, the cooking apparatus performs cooking one turkey based on the received cooking information, and when the cooking of the turkey is completed, outputs a voice saying completion of the cooking.

As shown in FIG. 10, when the user speaks a request ('cookie') together with a trigger word ('Hey, oven'), the cooking apparatus performs the speech recognition mode using the first server, and outputs a verbal response based on a command from the first server.

At this time, the cooking apparatus may output the verbal response ('moist cookie, crunchy cookie') asking for preference information of the user information according to the command of the first server.

When the user speaks a reactive word ('moist cookie') corresponding to the verbal response, the cooking apparatus transmits the spoken data corresponding to the spoken reactive word to the first server. After that, the cooking apparatus receives recipe information for cooking moist cookies from the first server, displays the received recipe information, and outputs a guidance voice ('recipe for making moist cookies') to the user.

After that, when the user speaks the cooking start command, the cooking apparatus performs cooking for baking the moist cookies based on the received cooking information, and outputs a verbal word saying completion of the cooking when the cooking of the cookies is completed.

As shown in FIG. 11, when the user speaks a request speech ('Pizza') together with a trigger word ('Hey, oven'), the cooking apparatus performs the speech recognition mode using the first server, and outputs a verbal response based on a command from the first server.

At this time, according to the command from the first server, the cooking apparatus may output a verbal response ('thin crust') related to preference information of the user information and a verbal response ('vegetarian pizza') related to religious information of the user information.

When the user speaks a reaction word ('yes') to the verbal response, the cooking apparatus transmits the spoken data to the first server. After that, the cooking apparatus receives recipe information for cooking a thin crust vegetarian pizza from the first server, displays the received recipe information, and outputs a guidance voice ('recipe of the thin crust vegetarian pizza) to the user.

After that, when the user speaks the cooking start command, the cooking apparatus performs baking a thin crust vegetarian pizza based on the received cooking information, and outputs a word indicating completion of the cooking when the cooking of the thin crust vegetarian pizza is completed.

Figure 12:
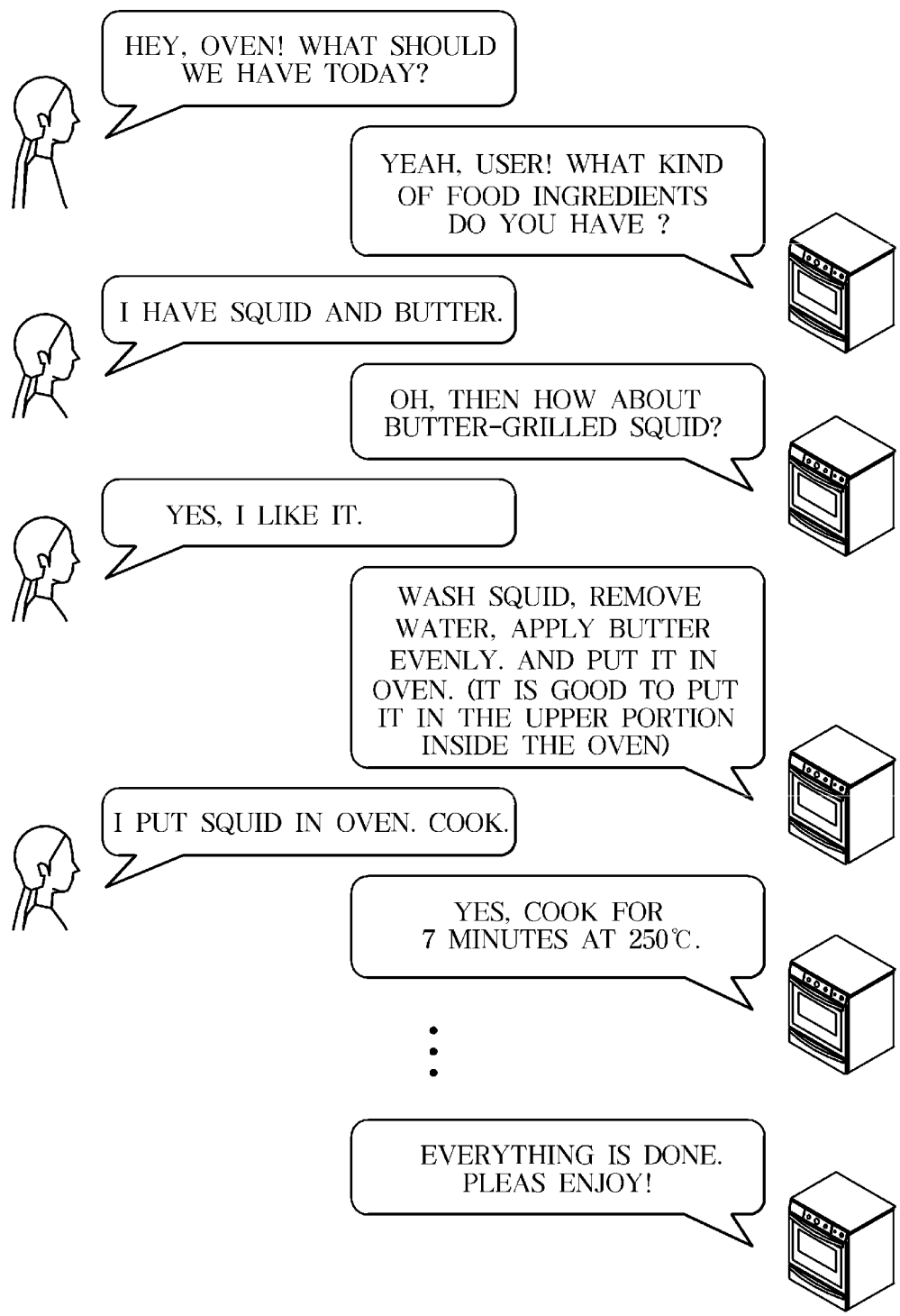

As shown in FIG. 12, when the user speaks a query ('What should we have today?') following a trigger word ('Hey, oven'), the cooking apparatus performs the speech recognition mode using the first server, and outputs a verbal response to the query of the user based on a command from the first server.

At this time, the cooking apparatus may output a query in voice asking what ingredients the user have as the verbal response to a command from the first server.

When the user answers a reaction word ('squid, butter') to the verbal response, the cooking apparatus transmits the spoken data to the first server. After that, the cooking apparatus obtains a recommendation menu that is available with the squid and butter from the first server, and outputs a verbal response ('butter grilled squid') asking for the obtained recommendation menu.

After that, when the user speaks a reaction word ('yes') to the verbal response, the cooking apparatus transmits the spoken data to the first server. After that, the cooking apparatus receives recipe information and guidance information of the butter grilled squid from the first server, outputs the received recipe information and a guidance voice (It's good to put the squid in the upper portion inside the oven') based on the guidance information.

After that, when the user speaks the cooking start command, the cooking apparatus performs cooking the butter grilled squid based on the received cooking information, and outputs a voice saying completion of the cooking when the cooking of the butter grilled squid is completed.

In addition, when information about an allergy to the peanut is stored as the user information in the first server, the first server may provide the cookie recipe information excluding the peanut in response to a request for a cookie recipe.

When a medical history about diabetes is stored as the user information in the first server, the first server may provide a cookie recipe with sugar minimized or removed in response to the cookie recipe request.

When job information indicating a monk is stored as the user information in the first server, the first server may obtain and provide a recipe with no meat from among a plurality of recipes for each menu.

Figure 13:
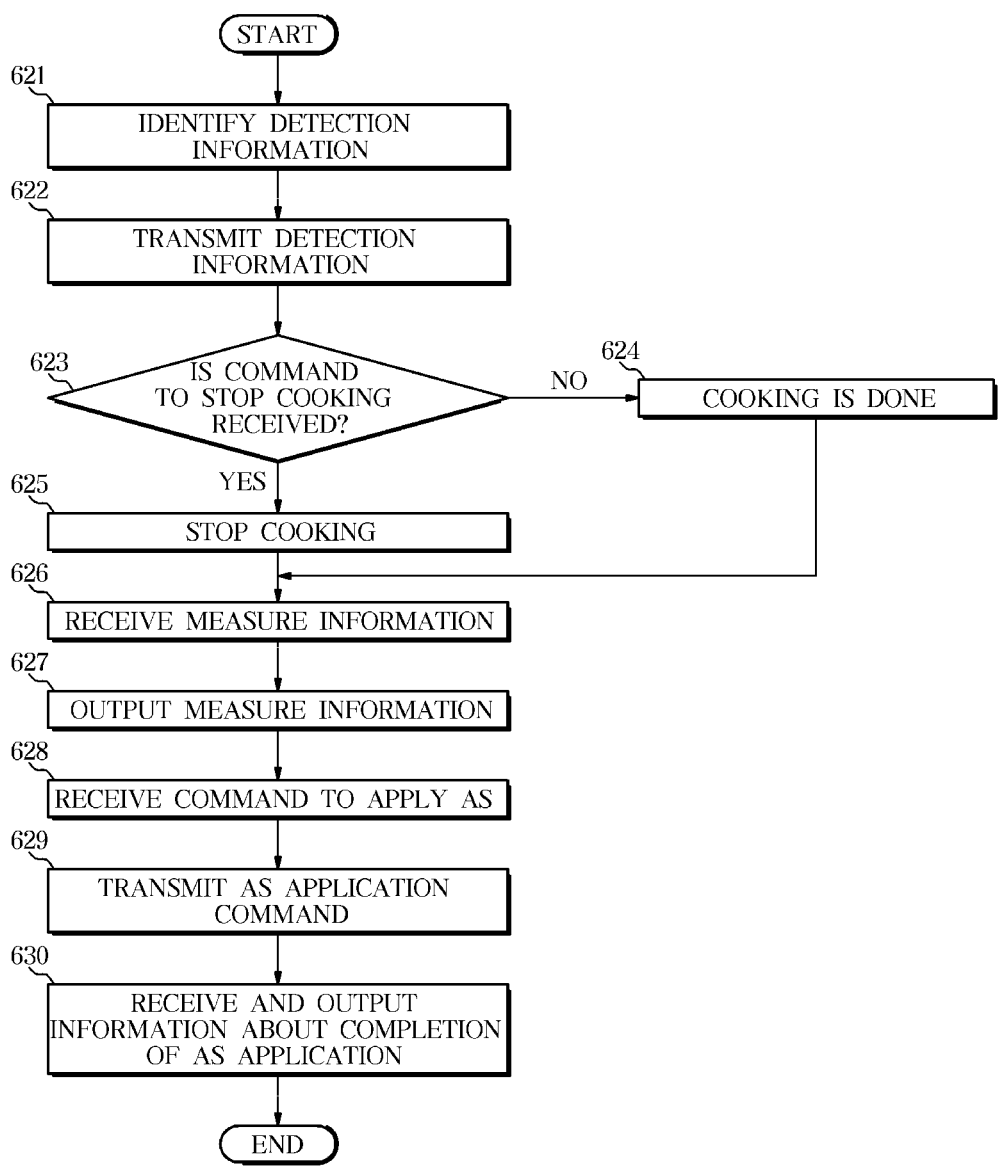
FIG. 13 is a flowchart for controlling an error of the cooking apparatus according to an embodiment.

FIG. 13 is a flowchart for controlling an error of the cooking apparatus according to an embodiment.

The cooking apparatus identifies detection information detected by the detector during a cooking operation (621).

The identifying of the detection information includes detecting a temperature inside the cooking chamber during the cooking operation, and checking the detected temperature, detecting the number of revolutions of the circulation motor and checking the detected number of revolutions, and detecting the number of revolutions of the cooling motor and checking the detected number of revolutions.

Next, the cooking apparatus transmits the detection information to the first server (622).

At this time, the first server determines whether the heating part, the circulator and the cooler are in an error state based on the detection information, i.e., the temperature inside the cooking chamber, the number of revolutions of the circulation motor and the number of revolutions of the cooling motor, and may determine to stop or maintain cooking according to the error determination result.

The cooking apparatus determines whether a command to stop cooking is received from the first server (623), and when it is determined that the command to stop cooking is not received, determines that a danger level is low, and keeps on cooking until cooking of the food is completed (624).

On the contrary, when the cooking apparatus determines that the command to stop cooking is received, determines that the danger level is high, and stops cooking of the food (625) and outputs the cooking stop information through the display or the sound output device, allowing the user to recognize that cooking is stopped.

The cooking apparatus receives information about measures from the first server (626), and outputs the received measure information (627).

Here, the outputting of the measure information includes displaying it in text on the display, or outputting it in voice through the sound output device.

The first server transmits the measure information when it is determined that the error of the cooking apparatus may be handled by the user, and when it is determined that the error of the cooking apparatus may not be handled by the user, transmits AS (After Service) request information as the measure information.

When the AS request is received through the input or the sound input (628), the cooking apparatus transmits the AS request to the first server (629). The first server then submits the AS request to an AS center for the cooking apparatus, and transmits information about the result of the AS request to the cooking apparatus.

When completion of the application of the AS request is informed from the first server, the cooking apparatus displays the received AS application completion information (630).

In addition, the cooking apparatus may output the AS application completion information through the sound output device.

The cooking apparatus may determine whether an error has occurred in the cooking apparatus. At this time, the cooking apparatus may transmit error information to the first server, and receive the measure information from the first server.

Figure 14:
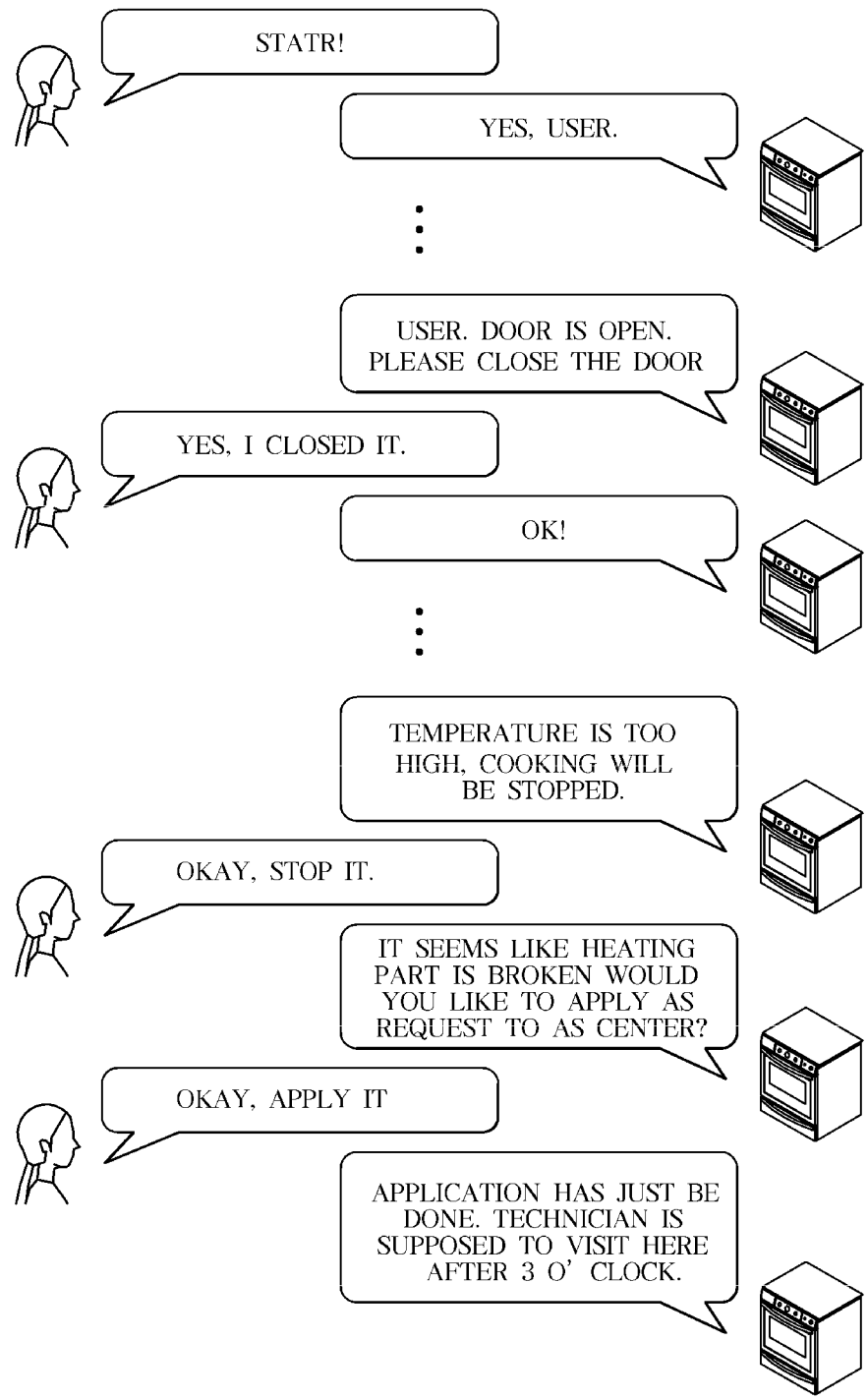
FIG. 14 illustrates a dialogue with a user regarding occurrence of an error of the cooking apparatus according to an embodiment.

FIG. 14 is an exemplary view illustrating a dialogue between a user and a cooking apparatus according to an embodiment.

As shown in FIG. 14, when the user speaks the cooking start command, the cooking apparatus detects whether the door is in the closed state and whether the cooking chamber contains food before starting a cooking operation based on the received cooking information, and transmits the detected information to the first server.

At this time, the first server generates response information to the detected information, converts the response information into spoken data, and transmits the spoken data to the cooking apparatus.

The cooking apparatus outputs the received response data in voice. For example, when it is determined that the door is in the open state, the cooking apparatus outputs a voice asking to close the door as a verbal response.

When the user speaks a reaction word ('Closed'), the cooking apparatus performs cooking based on the cooking information, and determines whether or not an error has occurred based on the detection information of the detector during the cooking operation, and when it is determined that the error has occurred, transmits error information to the first server.

The first server then transmits measure information for the error to the cooking apparatus, in which case the first server may transmit voice data corresponding to the error information and voice data corresponding to the measure information to the cooking apparatus.

The cooking apparatus outputs a verbal response ('temperature is too high, cooking will be stopped').

When the user speaks a reactive word, the cooking apparatus stops the cooking operation, and outputs a verbal response ('heating part failure, AS application needed') to take measures on the error according to a command from the first server.

When the user speaks a reaction word ('Please, apply'), the cooking apparatus transmits the spoken data to the first server, and when completion of the application is informed from the first server, outputs a verbal response to the received application completion information.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be read by a computer. For example, it may be a ROM, a RAM, a magnetic tape, a magnetic disk, a flash memory, an optical data storage device, etc.

The invention claimed is:

1. A cooking apparatus comprising:
a communicator configured to perform communication with a server for performing speech recognition and storing cooking information for each menu;
a heating part configured to generate heat to heat food;
a sound input configured to receive a speech from a user;
a controller configured to control the communicator to transmit speech data corresponding to the received speech to the server, receive cooking information transmitted from the server, and control operation of the heating part based on the received cooking information; and
a sound output device configured to output speech data transmitted from the server in voice,
wherein the controller is further configured to determine whether the cooking apparatus is in an error state based on an operation state of a plurality of loads, transmit error information to the server in response to determining that the cooking apparatus is in the error state, and receive measure information corresponding to the error information from the sever.

2. The cooking apparatus of claim 1, further comprising:
an input configured to receive a command to execute a speech recognition mode,
wherein, when the command to execute a speech recognition mode is received through the input, the controller activates operation of the sound input and operation of the sound output device.

3. The cooking apparatus of claim 1, further comprising:
a circulator configured to circulate the heat generated by the heating part,
wherein the controller is configured to control operation of the circulator based on the received cooking information.

4. The cooking apparatus of claim 1, further comprising:
an input configured to receive a command to set user information,
wherein, when the command to set user information is received through the input, the controller is configured to activate operation of the sound input and operation of the sound output device and control the communicator to transmit speech data corresponding to a speech received when the sound input is operating, to the server as the user information.

5. The cooking apparatus of claim 4, wherein the user information comprises at least one of identification information of the user, event information of the user, religion information of the user, and the address information of the user.

6. The cooking apparatus of claim 1, further comprising:
a display configured to display the received cooking information,
wherein, when recipe information is received from the server, the controller is configured to control the display to display the received recipe information.

7. The cooking apparatus of claim 1, further comprising:
a door configured to open or close a cooking chamber;
an open/close detector configured to detect an open state and a closed state of the door; and
an object detector configured to detect whether or not the cooking chamber contains food, wherein, when the door is in the closed state and the food is contained in the cooking chamber, the controller is configured to control the sound output device to output a notification sound corresponding to start of cooking.

8. The cooking apparatus of claim 1, further comprising: a detector to detect the operation state of the plurality of loads.

9. A cooking system comprising:
a cooking apparatus configured to input and output speech, transmit speech data corresponding to the input speech, and cook food in a cooking chamber; and
a server configured to perform communication with the cooking apparatus, when the speech data is received from the cooking apparatus, obtain request information of a user, query information of the user, and reaction information of the user corresponding to the received speech data, obtain cooking information based on at least one of the request information of the user, the query information of the user and the reaction information of the user, transmit the obtained cooking information to the cooking apparatus, and transmit response information to the query information to the cooking apparatus,
wherein the cooking apparatus comprises a controller configured to determine whether the cooking apparatus is in an error state based on an operation state of a plurality of loads, transmit error information to the server in response to determining that the cooking apparatus is in the error state, and receive measure information corresponding to the error information from the sever.

10. The cooking system of claim 9, wherein the cooking information includes a cooking temperature and a cooking time.

11. The cooking system of claim 9, wherein the server includes:
a first converter configured to convert the received speech data to text data;
a natural language recognizer configured to perform natural language recognition on the converted text data, obtain the request information of the user, the reaction information of the user and the query information of the user based on the natural language recognition, and generate response information to the obtained query information;
a data portal configured to transmit the obtained request information to a recipe providing server, and receive recipe information from the recipe providing server; and
a second converter configured to convert the generated response information into speech data, and transmit the converted speech data to the cooking apparatus.

12. The cooking system of claim 11, wherein the server further comprises:
an error responder configured to obtain measure information for error information of the cooking apparatus, and transmit the obtained measure information to the cooking apparatus.

13. The cooking system of claim 9, wherein the server includes:
an information storage configured to store user information;
a controller configured to obtain information about an optimum recipe from a plurality of recipes based on the request information and the user information, and transmit the obtained optimum recipe information to the cooking apparatus.

14. The cooking system of claim 13, wherein the user information comprises at least one of identification information of the user, event information of the user, religion information of the user, and address information of the user.

15. The cooking system of claim 9, wherein the server further comprises:
a first server configured to obtain a menu requested by the user based on the received speech data, and transmit a cooking time and a cooking temperature for the obtained menu to the cooking apparatus; and
a second server configured to store information about at least one recipe for a plurality of menus, communicate with the first server, and transmit the information about at least one recipe to the first server.

16. The cooking system of claim 15, wherein the first server is configured to obtain information about a preference of the user based on a cooking history of the cooking apparatus, stores at least one of identification information of the user, event information of the user, religion information of the user, address information of the user and the user preference information as user information, and transmit the stored user information to the second server,
wherein the user preference information comprises at least one of a menu name, an amount to be cooked, a degree to which the food is baked, a water content, a level of each flavor, and a texture of food.

* * * * *